(12) United States Patent
Miura et al.

(10) Patent No.: US 10,053,043 B2
(45) Date of Patent: Aug. 21, 2018

(54) AIRBAG FOR A FRONT PASSENGER SEAT

(71) Applicant: TOYODA GOSEI CO., LTD., Kiyosu-shi, Aichi-ken (JP)

(72) Inventors: Wataru Miura, Kiyosu (JP); Hiromi Tamai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/356,732

(22) Filed: Nov. 21, 2016

(65) Prior Publication Data

US 2017/0210326 A1    Jul. 27, 2017

(30) Foreign Application Priority Data

Jan. 26, 2016  (JP) .................................. 2016-12708

(51) Int. Cl.
  *B60R 21/205* (2011.01)
  *B60R 21/231* (2011.01)
  *B60R 21/2338* (2011.01)
  *B60R 21/239* (2006.01)
  *B60R 21/235* (2006.01)

(52) U.S. Cl.
  CPC .......... *B60R 21/205* (2013.01); *B60R 21/231* (2013.01); *B60R 21/239* (2013.01); *B60R 21/2338* (2013.01); *B60R 2021/23382* (2013.01); *B60R 2021/23538* (2013.01)

(58) Field of Classification Search
  CPC ... B60R 21/205; B60R 21/239; B60R 21/231; B60R 21/2338; B60R 2021/23538; B60R 2021/23382
  See application file for complete search history.

(56) References Cited

U.S. PATENT DOCUMENTS

| | | | | |
|---|---|---|---|---|
| 3,990,726 A | * | 11/1976 | Oka .................. | B60R 21/239 137/68.11 |
| 5,704,639 A | * | 1/1998 | Cundill .............. | B60R 21/239 280/739 |
| 7,631,894 B2 | * | 12/2009 | Hasebe .............. | B60R 21/201 280/743.2 |
| 9,676,364 B2 | * | 6/2017 | Williams ............ | B60R 21/239 |

(Continued)

FOREIGN PATENT DOCUMENTS

| | | |
|---|---|---|
| JP | 2000-142307 A | 5/2000 |
| JP | 2001-354108 A | 12/2001 |
| JP | 4244896 B2 | 1/2009 |

*Primary Examiner* — Drew J Brown
(74) *Attorney, Agent, or Firm* — POSZ Law Group, PLC

(57) ABSTRACT

An airbag for a front passenger seat includes a passenger-side wall and a circumferential wall that extends forward from the passenger-side wall in a narrowing fashion. One each vent hole is formed on a left wall region and a right wall region of the circumferential wall for releasing an extra inflation gas. Each of the vent holes is formed into an elongate hole whose long axis extends generally along a direction that a passenger advances. A tether is disposed inside the airbag so as to be deployable generally along a left and right direction. The tether is disposed at such a position as to exert a tension force in a peripheral region of the vent hole in a direction generally orthogonal to the direction that the passenger advances when the passenger-side wall catches the passenger.

8 Claims, 18 Drawing Sheets

(56) References Cited

U.S. PATENT DOCUMENTS

| | | | |
|---|---|---|---|
| 2007/0024032 A1* | 2/2007 | Hasebe | B60R 21/237 280/729 |
| 2010/0032931 A1* | 2/2010 | Kumagai | B60R 21/2338 280/742 |
| 2010/0116186 A1* | 5/2010 | Kumagai | B60R 21/233 112/475.08 |
| 2010/0156076 A1* | 6/2010 | Miyata | B60R 21/233 280/743.1 |
| 2010/0156078 A1* | 6/2010 | Miyata | B60R 21/231 280/743.2 |
| 2011/0042922 A1* | 2/2011 | Miyata | B60R 21/233 280/730.1 |
| 2011/0101652 A1* | 5/2011 | Abe | B60R 21/2338 280/728.3 |
| 2012/0126515 A1* | 5/2012 | Miyata | B60R 21/237 280/730.1 |
| 2013/0056966 A1* | 3/2013 | Miyata | B60R 21/231 280/743.1 |
| 2013/0313809 A1* | 11/2013 | Yamaji | B60R 21/203 280/729 |
| 2013/0334801 A1* | 12/2013 | Williams | B60R 21/239 280/739 |
| 2014/0225354 A1* | 8/2014 | Williams | B60R 21/239 280/743.1 |
| 2015/0115584 A1* | 4/2015 | Smitterberg | B60R 21/239 280/742 |
| 2016/0167615 A1* | 6/2016 | Hiruta | B60R 21/2342 280/739 |
| 2017/0088087 A1* | 3/2017 | Williams | B60R 21/2338 |
| 2017/0197578 A1* | 7/2017 | Hatfield | B60R 21/239 |

* cited by examiner

AIRBAG FOR A FRONT PASSENGER SEAT

CROSS REFERENCE TO RELATED APPLICATIONS

The present application claims priority from Japanese Patent Application No. 2016-012708 of Miura et al., filed on Jan. 26, 2016, the entire disclosure of which is incorporated herein by reference.

BACKGROUND OF THE INVENTION

1. Field of the Invention

The present invention relates to an airbag for a front passenger seat which is adapted to be stored in a storage provided inside an instrument panel of a vehicle which is located in front of a front passenger seat, and is deployable rearward when fed with an inflation gas.

2. Description of Related Art

A conventional airbag for a front passenger seat includes a passenger-side wall which is deployable at the rear end, a circumferential wall which extends forward from the passenger-side wall in a narrowing fashion and one each vent hole which is disposed at a right region and a left region of the circumferential wall in an opposed fashion for releasing an extra inflation gas. JP2001-354108A discloses an airbag for a front passenger seat with a vent hole which is formed in a slot-like shape so as to be deformable in such a fashion as to open widely for releasing an inflation gas when the passenger-side wall catches a passenger and is pressed forward. More specifically, when the airbag emerges out of the storage, a tension force is exerted on the circumferential wall of the airbag, including a region in a vicinity of the vent hole. The slot-like vent hole of the above conventional airbag is configured to extend along an acting direction of the tension force.

However, in the above conventional airbag, since the vent holes are merely formed on the circumferential wall, they can open inadvertently due to the tension force or the like before the passenger-side wall catches the passenger.

SUMMARY OF THE INVENTION

An object of the present invention is to provide an airbag for a front passenger seat that is capable of opening a vent hole in a steady fashion when catching a passenger, and thus is capable of protecting the passenger in an adequate fashion with a good exhaust property.

The object of the invention will be achieved by the following airbag for a front passenger seat:

The airbag of the invention is adapted to be stored in a storage which is disposed on an instrument panel of a vehicle in front of the front passenger seat. The airbag is inflatable and deployable rearward when fed with an inflation gas. The airbag includes a passenger-side wall that is deployable generally along an up and down direction at a rear end of the airbag for catching a front-seat passenger, and a circumferential wall that is deployable in such a manner as to extend forward from the passenger-side wall in a narrowing fashion. The circumferential wall is configured to be mounted on the storage by the front end region.

The airbag further includes a vent hole for releasing an extra inflation gas, the vent hole is formed on each of a left wall region and a right wall region of the circumferential wall at airbag deployment, which left and right wall regions are opposed to each other in a left and right direction at airbag deployment. Each of the vent holes is formed into an elongate hole whose long axis extends generally along a direction that the front-seat passenger advances.

The airbag further includes a tether inside the airbag which is deployable generally along a left and right direction. The tether is disposed at such a position as to exert a tension force in a peripheral region of the vent hole in a direction generally orthogonal to the direction that the passenger advances when the passenger-side wall catches the passenger.

In the airbag of the invention, each of the vent holes is formed into an elongate, slot-like contour whose long axis extends generally along a direction that the front-seat passenger advances, and is configured deformable due to a tension force which is caused by the tether and acts in the peripheral region of the vent hole in the direction generally orthogonal to the direction that the front-seat passenger advances when the passenger-side wall catches the passenger. That is, in the airbag of the invention, when the passenger-side wall catches the passenger, each of the vent holes is deformed, along with the forward movement of the passenger, in such a manner as to stretch in an up and down direction, i.e., in a direction generally orthogonal to the travel direction of the passenger. In other words, since the opposite ends in an axial direction of each of the vent holes come close to each other and each of the vent holes opens towards the direction generally orthogonal to the travel direction of the passenger, each of the vent holes is deformed into a shape approximate to a true circle. Moreover, the tether is disposed at such a position as to exert a tension force in the peripheral regions of the vent holes in a direction generally orthogonal to the direction that the passenger moves when the passenger-side wall catches a passenger. That is, such a tension force is not exerted in the peripheral regions of the vent holes before the passenger-side wall catches the passenger, thus the vent holes are kept in an elongate shape and prevented from opening widely. Accordingly, the airbag of the invention is capable of preventing a great deal of inflation gas from escaping out of the vent holes before catching the passenger, and is capable of releasing a great deal of inflation gas out of the widely open vent holes when catching the passenger. That is, the airbag of the invention is capable of cushioning a passenger softly and protecting him smoothly since the airbag catches the passenger in a fully inflated state and starts releasing a great deal of inflation gas when bumping the passenger.

Therefore, the airbag of the invention is capable of opening the vent holes widely in a steady fashion when catching a passenger, and is capable of protecting the passenger in an adequate fashion with a good exhaust property.

The airbag for a front passenger seat of the invention preferably includes a plurality of the tethers so as to correspond to each of the vent holes, and desirably a first end of each of the tethers is jointed to a vicinity of a rear edge of the vent hole and a second end of each of the tethers is jointed to the passenger-side wall.

With this configuration, each of the tethers connects the vicinity of the rear edge of the vent hole and passenger-side wall straightly at airbag deployment, such that a tension force (a first tension force) is exerted between the joint to the vicinity of the rear edge of the vent hole and the joint to the passenger-side wall. Before catching the passenger, the tension force acts in the peripheral regions of the vent holes in a generally long axis direction of the vent holes, and therefore, the vent holes are kept in the shape of an elongate hole. Then when the passenger is thrown against the passenger-side wall and presses the wall forward, the tethers loosen, then another (or second) tension force is exerted in the peripheral regions of the vent holes in the direction generally orthogonal to the moving direction of the passenger, and this tension force gradually overpowers the first tension force acting along the long axis direction of the vent hole, such that the vent holes are deformed in such a fashion as to open widely. Therefore, the airbag of the invention is capable of keeping the vent holes in the shape of an elongate hole and preventing an inadvertent escape of inflation gas before catching the passenger in a further adequate fashion.

Alternatively, the tether may be configured to connect the left wall region and right wall region of the circumferential wall for regulating a clearance between the left wall region and right wall region at airbag deployment. Such a tether will help prevent the left wall region and right wall region from being deformed in such a manner as to draw away from each other when the passenger-side wall catches a passenger and is deformed in such a manner as to be pressed forward. At this time, an upper wall region and a lower wall region of the circumferential wall, which are opposed in an up and down direction, will bulge in such a manner as to draw away from each other, and pull and stretch the left wall region and right wall region in an up and down direction. That is, the tether will help exert a tension force in the peripheries of the vent holes so as to deform the vent holes smoothly to open widely, such that a great deal of inflation gas will be released out of the deformed vent holes when the airbag catches the passenger.

In the above instance, the airbag further preferably includes a patch that is composed of a flexible sheet-shaped member and covers at least a part of an opening area of the vent hole at airbag deployment. The patch is jointed to the circumferential wall only by the opposite edges in a long axis direction of the vent hole. Such a patch will suppress the escape of an inflation gas before the airbag catches a passenger, and since the patch is jointed to the circumferential wall only by the opposite edges in a long axis direction of the vent hole, the patch will not hinder the deformation of the vent hole when the airbag catches the passenger, but loosen along with the deformation of the vent hole and allow the deformed vent hole to release a great deal of inflation gas.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
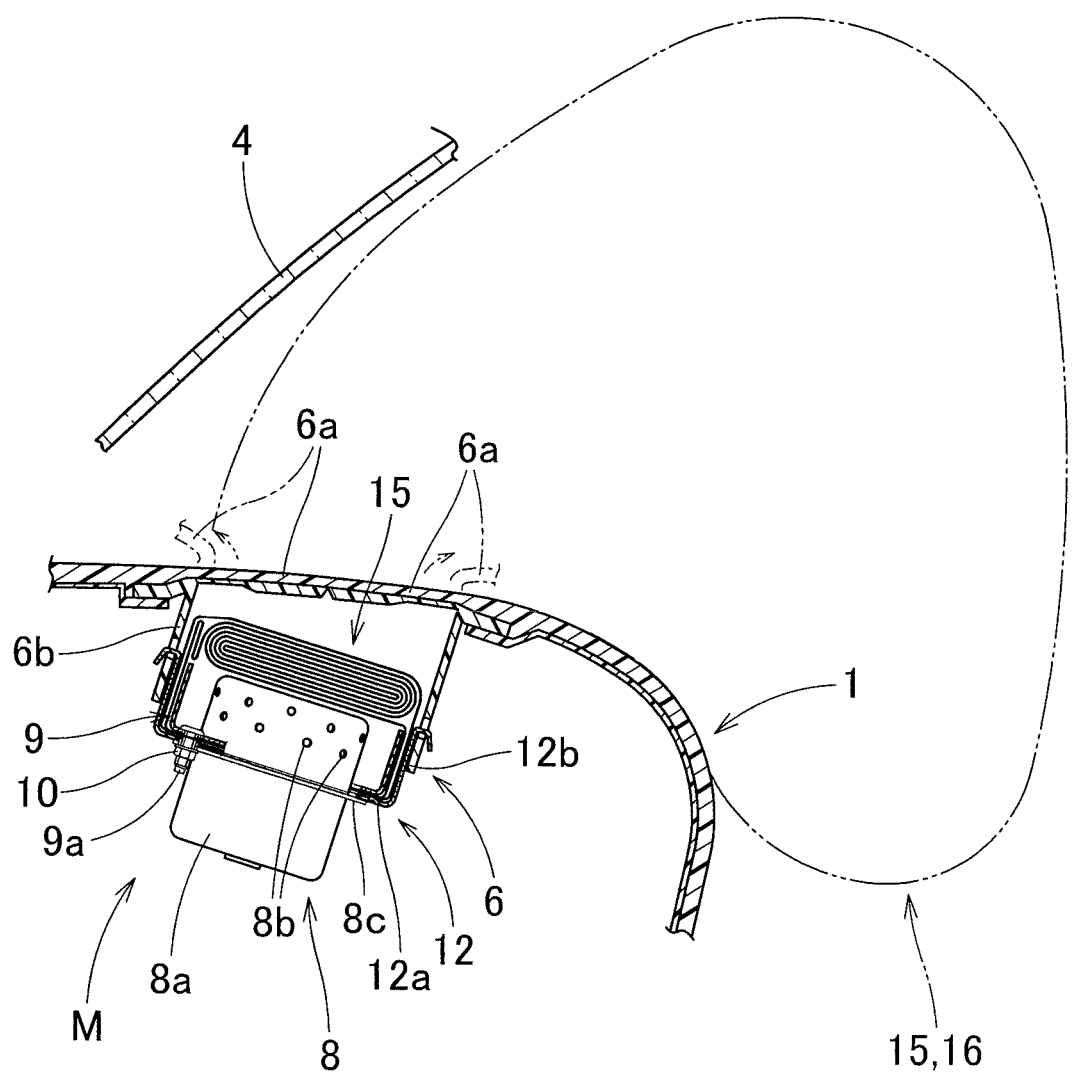
FIG. 1 is a schematic vertical section of an airbag device for a front passenger seat which employs an airbag according to the first embodiment of the invention, as mounted on a vehicle.

An airbag 15 for a front passenger seat of the first embodiment is used in an airbag device M for a front passenger seat depicted in FIG. 1. As shown in FIG. 1, the airbag device M is a top-mount airbag device stored inside a top plane 2 of an instrument panel or dashboard 1, in front of the front passenger seat. Unless otherwise specified, a front and rear direction, an up and down direction and a left and right direction in the following description are intended to refer to a front and rear direction, an up and down direction and a left and right direction of a vehicle V.

As shown in FIG. 1, the airbag device M includes an airbag 15, which is folded up, an inflator 8 for supplying the airbag 15 with an inflation gas, a case or storage 12 for housing and holding the airbag 15 and inflator 8, a retainer 9 for attaching the airbag 15 and inflator 8 to the case 12 and an airbag cover 6 for covering the airbag 15.

The airbag cover 6 is integral with the dashboard 1 which is made from synthetic resin and includes two doors, i.e., front and rear doors 6a, adapted to open when pushed by the airbag 15 upon airbag deployment. The airbag cover 6 further includes around the doors 6a a joint wall 6b, which protrudes downwardly for engagement with the case 12.

As shown in FIG. 1, the inflator 8 includes a main body 8a that is formed into a generally pot-like shape and provided with a plurality of gas discharge ports 8b, and a flange 8c for attachment to the case 12.

The case 12 is made of sheet metal into a generally parallelepiped with a generally rectangular opening at the top. The case 12 includes a generally rectangular bottom wall 12a and a circumferential wall 12b extending upward from the outer edge of the bottom wall 12a and retaining the joint wall 6b of the airbag cover 6. The airbag 15 and inflator 8 are attached to the bottom wall 12a of the case 12 by locating the retainer 9 inside the airbag 15 such that the bolts 9a of the retainer 9 go through the periphery of the gas inlet port 20 of the airbag 15, the bottom wall 12a of the case 12 and flange 8c of the inflator 8 and by fastening the bolts 9a with nuts 10. Further, unillustrated brackets are provided on the bottom wall 12a of the case 12 for mounting on a vehicle body structure.

Figure 2:
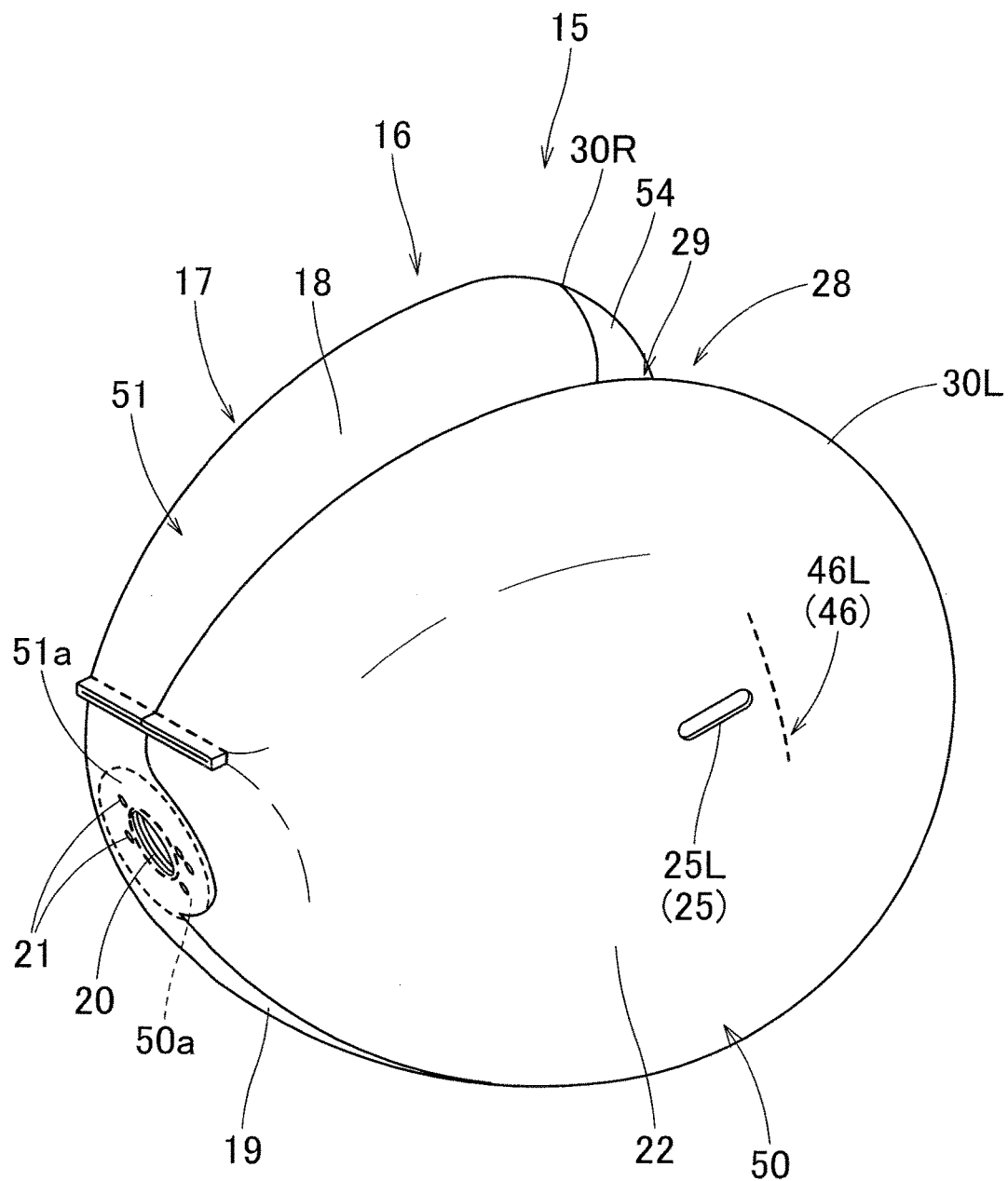
FIG. 2 is a perspective view of the airbag of the first embodiment as inflated by itself.
Figure 3:
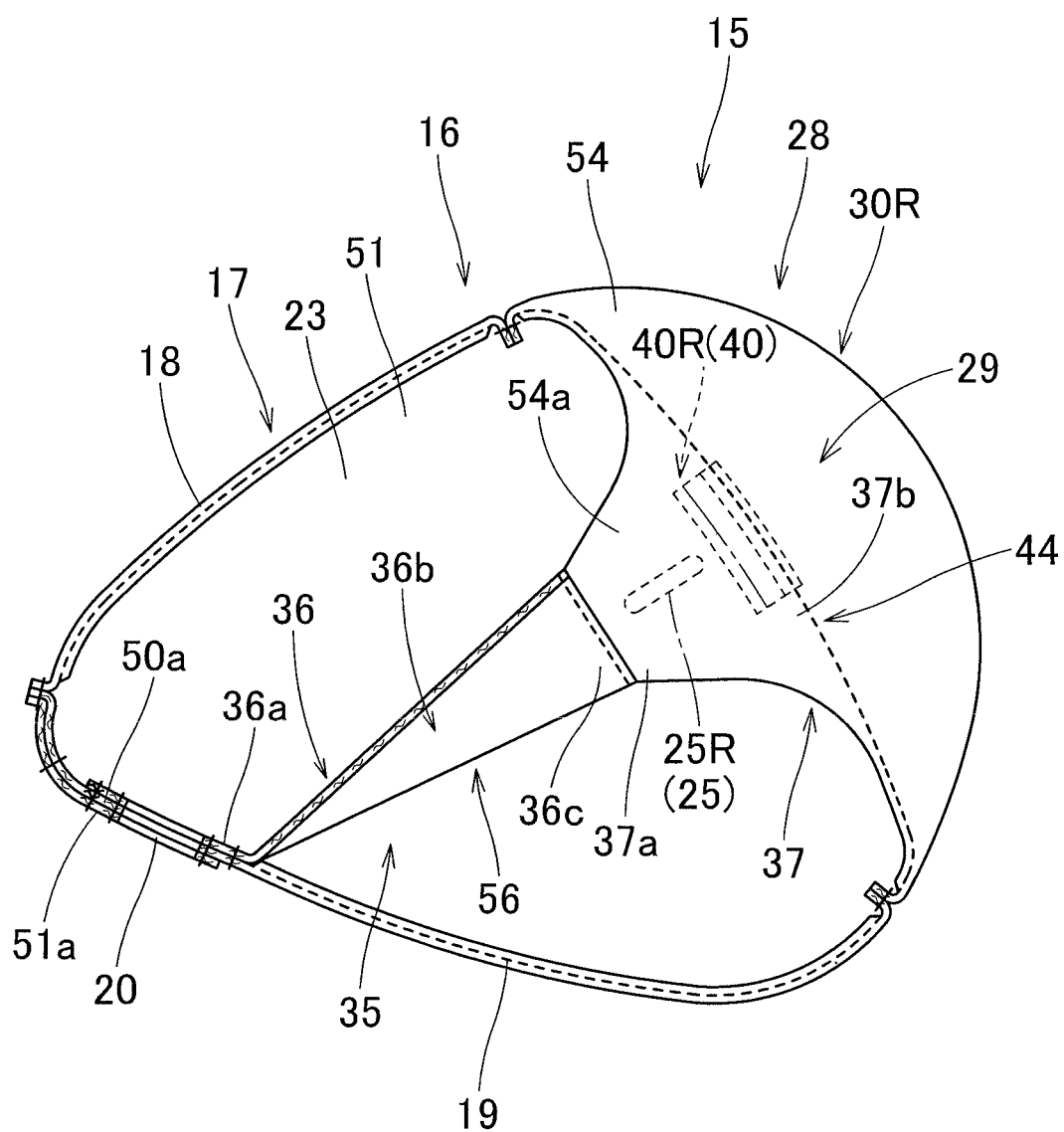
FIG. 3 is a schematic vertical section of the airbag of FIG. 2 taken along a front and rear direction.
Figure 4:
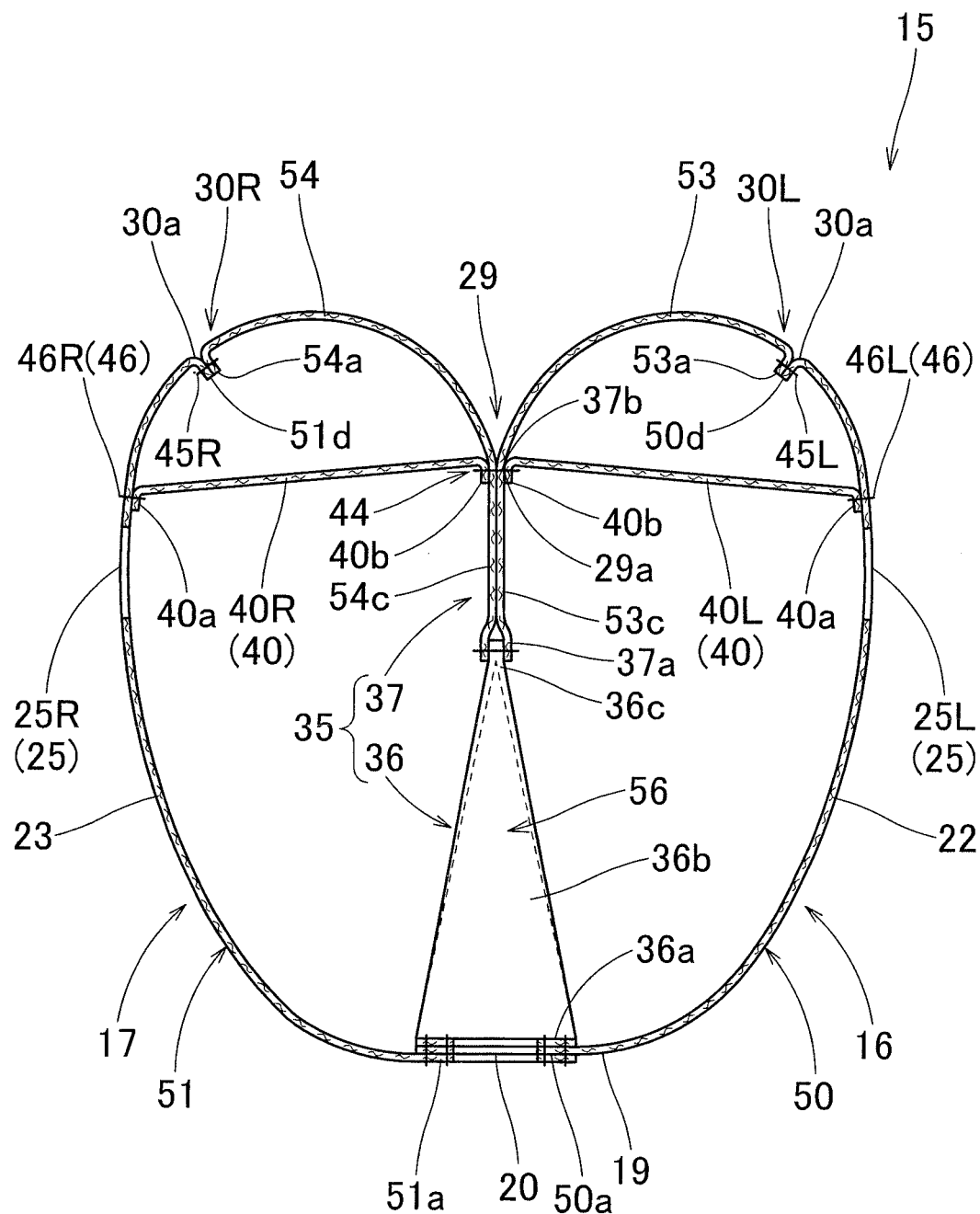
FIG. 4 is a schematic horizontal section of the airbag of FIG. 2 taken along a front and rear direction.

Referring to FIGS. 2 to 4, the airbag 15 includes a bag body 16 which is inflatable with an inflation gas, a front-rear tether 35 which is disposed inside the bag body 16 for regulating the contour of the bag body 16 as fully inflated, and a regulating tether 40 (40L and 40R) that is located inside the bag body 16 for controlling the shape of later-described vent holes 25 (25L and 25R).

Figure 6:
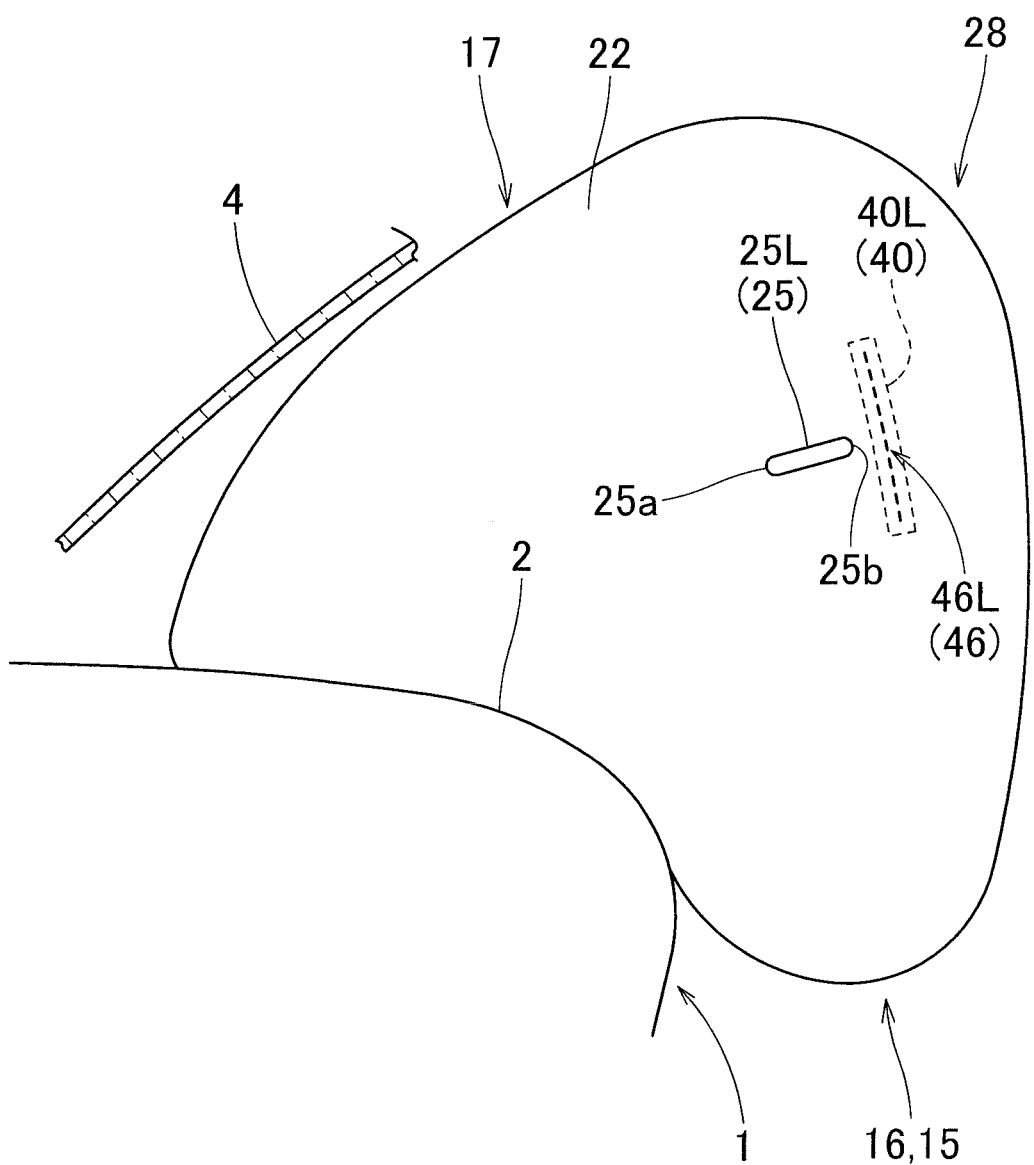
FIG. 6 is a side view of the airbag device of FIG. 1 as the airbag is fully deployed.

As shown in FIGS. 1 and 6, the bag body 16 is designed to inflate and deploy in such a shape that fills up a space between the top plane 2 of the dashboard 1 and a windshield 4. More specifically, the bag body 16 includes a passenger-side wall 28 which is deployable generally along an up and down direction at the rear and a circumferential wall 17 which extends forward from the passenger-side wall 28 in a narrowing fashion. In the illustrated embodiment, the bag body 16 is designed to inflate into a generally square conical contour whose top is located at the front end of the circumferential wall 17, and the bag body 16 is mounted on the case 12 at the front end.

The circumferential wall 17 is mainly so deployable as to fill up the space between the top plane 2 of the dashboard 1 and the windshield 4, and includes an upper wall region 18 and a lower wall region 19 which are opposed to each other in an up and down direction and disposed generally along a left and right direction, and a left wall region 22 and a right wall region 23 which are opposed to each other in a left and right direction and disposed generally along a front and rear direction. A generally round gas inlet port 20 is formed proximate the front end of the lower wall region 19 for receiving the main body 8a of the inflator 8. A plurality of (four, in the illustrated embodiment) mounting holes 21 are formed in the periphery of the inlet port 20 of the lower wall region 19 for receiving the bolts 9a of the retainer 9, which mounts the periphery of the inlet port 20 on the bottom wall 12a of the case 12.

The circumferential wall 17 is provided with a vent hole 25 (25L and 25R) on each of the left wall region 22 and right wall region 23 for releasing an extra inflation gas. The vent holes 25L and 25R are generally identical in outer contour, and are located at bilaterally symmetrical positions on the circumferential wall 17. As shown in FIG. 3, each of the vent holes 25L and 25R of the illustrated embodiment is formed to the rear with respect to the center in a front and rear direction and at a generally center in an up and down direction of the bag body 16 as inflated by itself. More specifically, each of the vent holes 25L and 25R is located at such a position as to overlap with a later-described rear section 37 of the front-rear tether 35 at airbag deployment, when viewed from a side. As shown in FIG. 6, each of the vent holes 25 is formed into an elongate, slot-like contour whose long axis extends generally along a front and rear direction, i.e., along a direction that the front-seat passenger MP advances in the event of a frontal collision of the vehicle, when the bag body 16 is fully inflated. More specifically, the vent hole 25 of the illustrated embodiment is formed into a slotted hole which has a generally uniform opening width in an entire region in a front and rear direction and slightly slants backward and upward with respect to a front and rear direction such that the rear edge 25b is disposed slightly above the front edge 25a at full inflation of the bag body 16 (FIG. 6).

The passenger-side wall 28 is configured to be deployed generally vertically at the rear end of the bag body 16 in such a manner as to face the front-seat passenger MP for catching the passenger MP. As shown in FIGS. 2 to 4, the passenger-side wall 28 as inflated includes a recessed region 29 that is sunken forward and extends generally vertically generally at the center in a left and right direction. In this specific embodiment, the recessed region 29 extends over a generally entire area in an up and down direction of the passenger-side wall 28. On the left and right sides of the recessed region 29 are raised regions 30L and 30R that protrude rearward relative to the recessed region 29. That is, at full airbag inflation, the recessed region 29, which is sunken at the center in a left and right direction, and the raised regions 30L and 30R, which are located on the left and right of the recessed region 29, extend continuously along an up and down direction of the passenger-side wall 28 of the bag body 16 (FIGS. 3 and 4). More specifically, in the illustrated embodiment, this unevenness created by the recessed region 29 and raised regions 30L and 30R extends in a uniform fashion on the passenger-side wall 28 and converges forward on the upper wall region 18 and lower wall region 19 of the circumferential wall 17. In this embodiment, a later-described seam 44, which sews inner circumferential edges 53b and 54b of a later-described inner left panel 53 and an inner right panel 54 together, forms the leading end 29a of the recessed region 29, whereas later-described seams 45L and 45R, which respectively sew up each of rear edges 50d and 51d of later-described outer left panel 50 and outer right panel 51 and outer circumferential edges 53a and 54a of the inner left panel 53 and inner right panel 54, form tops 30a of the raised regions 30L and 30R (FIGS. 3 and 4).

The front-rear tether 35 connects the region in a vicinity of the gas inlet port 20 and passenger-side wall 28 inside the bag body 16 in order to regulate the contour of the bag body 16 at deployment. The front-rear tether 35 is deployable generally along a front and rear direction. The front-rear tether 35 is formed by jointing a front section 36 which extends from the periphery of the gas inlet port 20 and a rear section 37 which extends from the passenger-side wall 28.

Figure 5:
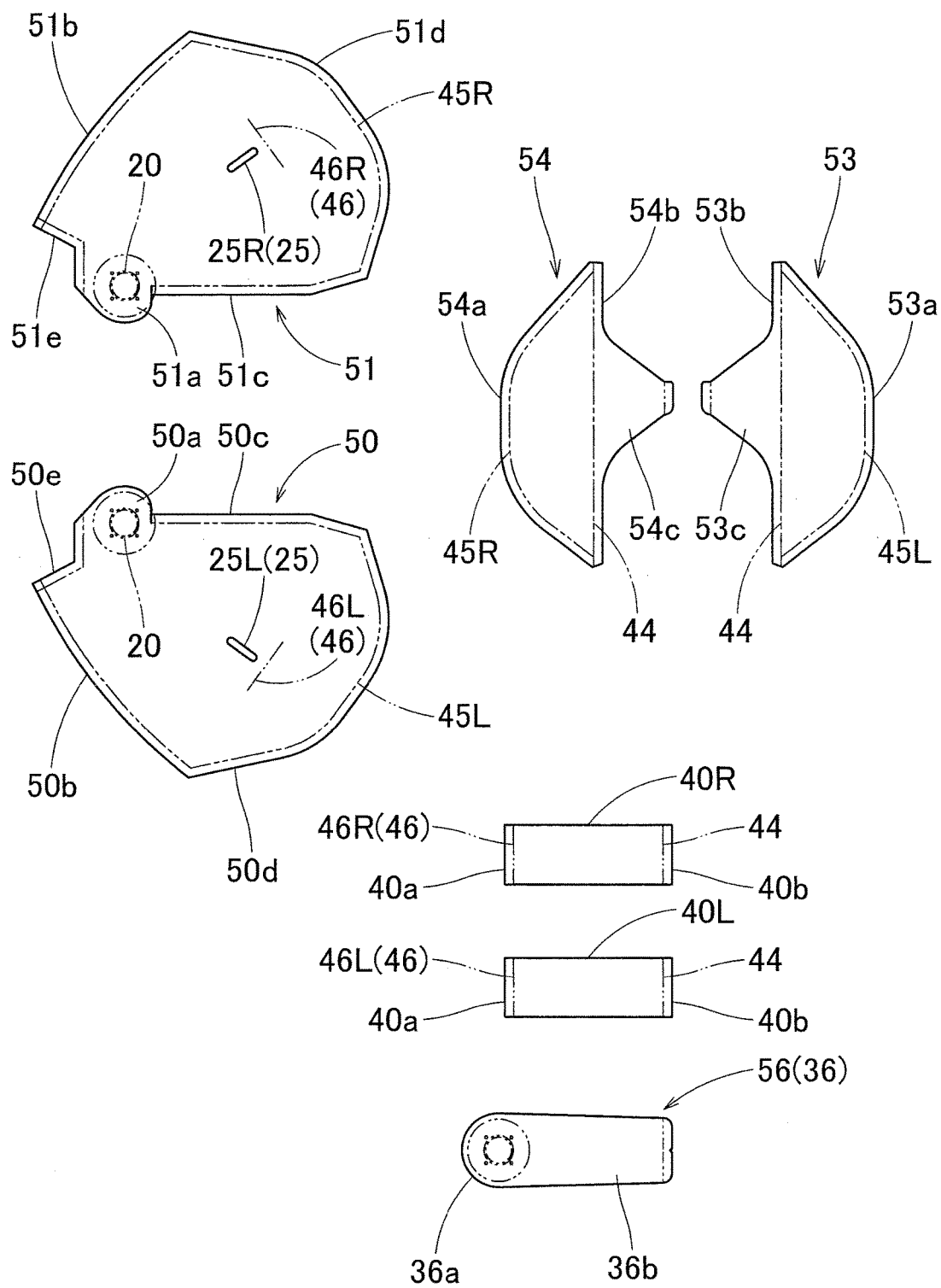
FIG. 5 depicts base cloths of the airbag of the first embodiment by plan views.

The front section 36 is formed by folding a front component 56 shown in FIG. 5, and is formed into a bilaterally symmetric contour about the gas inlet port 20. As shown in FIGS. 3 and 4, at airbag deployment, the front section 36 is formed into such a three-dimensional contour approximate to a generally triangular pyramid that the front end region extends generally along a left and right direction and the rear end region is disposed generally along an up and down direction. In the front section 36 of the illustrated embodiment, as shown in FIG. 4, the front end region serves as a joint region 36a to the bag body 16. The joint region 36a is provided with openings (reference numerals omitted) which correspond to the gas inlet port 20 and mounting holes 21, and is sewn to the lower wall region 19 by the entire peripheral region of the gas inlet port 20 (FIGS. 2 and 3). The region of the front section 36 extending rearward from the gas inlet port 20 constitutes a main body 36b which is deployable into a three-dimensional contour approximate to a generally triangular pyramid (FIGS. 3 and 4). The width in an up and down direction of the rear end 36c of the main body 36b is generally coincident with the width in an up and down direction of the front end 37a of the rear section 37. The rear end 36c of the main body 36b is jointed with the front end 37a of the rear section 37.

As shown in FIGS. 3 to 5, the rear section 37 has a sheet shape, and is composed of extended regions 53c and 54c of the inner left panel 53 and inner right panel 54 which constitute the passenger-side wall 28. The extended regions 53c and 54c extend from the inner circumferential edges 53b and 54b of the inner left panel 53 and inner right panel 54 and are integral with the inner left panel 53 and inner right panel 54. In other words, the rear section 37 has a two-ply structure and is integral with the inner left panel 53 and inner right panel 54. More specifically, the rear section 37 has a generally trapezoidal contour which enlarges in an up and down direction towards the rear end 37b from the narrow front end 37a which is jointed to the front section 36.

The front-rear tether 35 limits the clearance between the generally center in a left and right direction of the passenger-side wall 28 (i.e., the recessed region 29) and the periphery of the gas inlet port 20 at airbag deployment. The front-rear tether 35 prevents the region in a vicinity of the leading end 29a of the recessed region 29 from protruding rearward, i.e., towards the front passenger seat, in an initial phase of airbag deployment, and keeps the recessed region 29 recessed in an adequate fashion at full deployment of the bag body 16.

Figure 7:
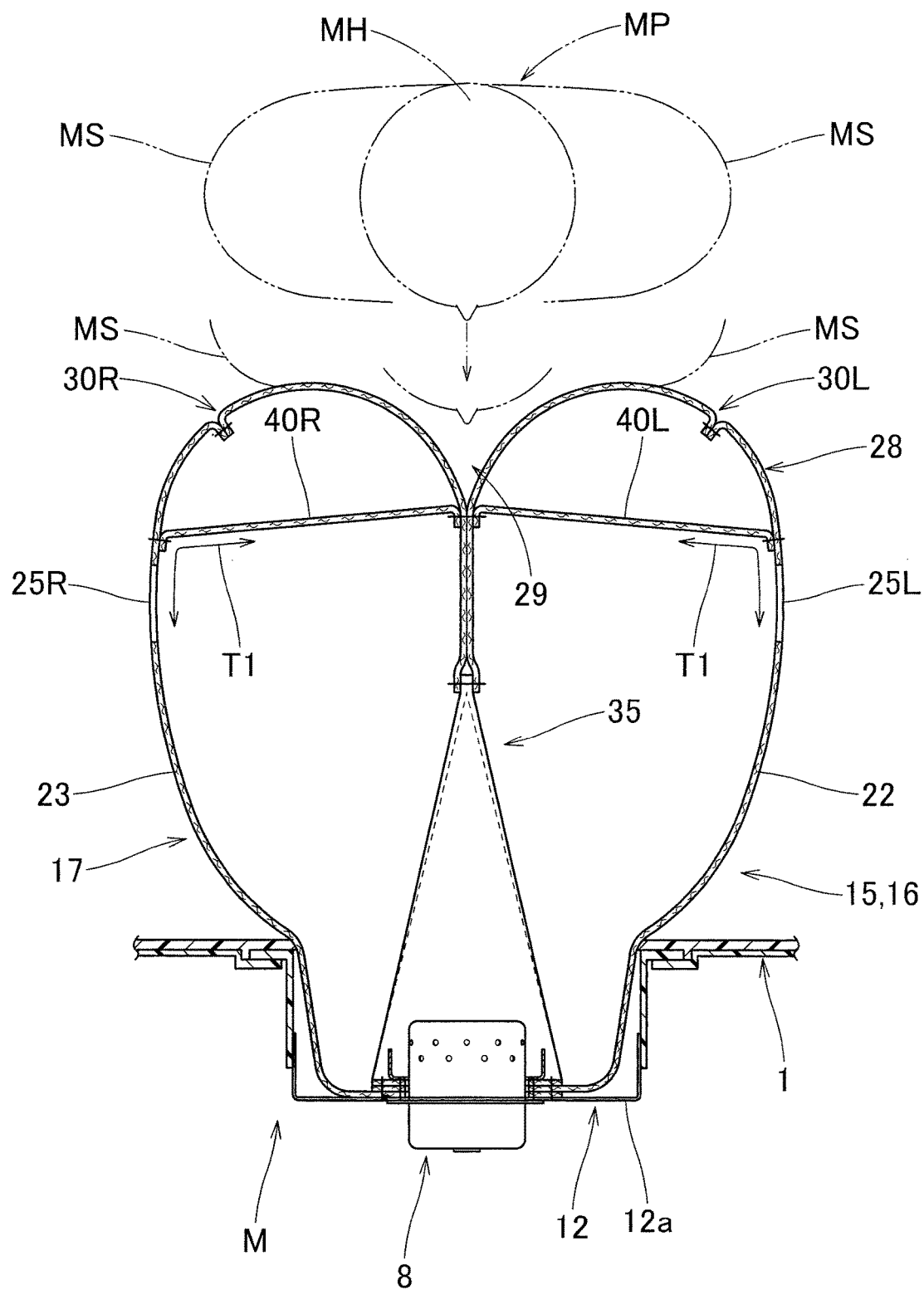
FIG. 7 is a schematic horizontal section of the airbag device of FIG. 1 as the airbag is fully deployed.

The regulating tether 40 for controlling the shape of the vent hole 25 is deployable generally along a left and right direction inside the bag body 16. In the illustrated embodiment, as shown in FIG. 4, there are provided two regulating tethers 40L and 40R to accommodate the two vent holes 25L and 25R. Each of the regulating tethers 40 is jointed to a vicinity of the rear edge 25b of the vent hole 25L/25R by the first end and is jointed to the passenger-side wall 28 by the second end. More specifically, an outer end 40a of each of the regulating tethers 40L and 40R, which is located proximate the outer shell of the bag body 16, is jointed to the rear side of the vent hole 25L/25R of the left wall region 22/right wall region 23, while an inner end 40b, which is located at an inner region of the bag body 16, is jointed to the leading end 29a of the recessed region 29 of the passenger-side wall 28. Each of the regulating tethers 40 is deployable generally along a left and right direction straightly in such a fashion that the inner end 40b is located slightly farther rearward than the outer end 40a, as viewed from an up and down direction. The length of each of the regulating tethers 40 is such as to exert a tension force T1 between the outer end 40a and inner end 40b along the length direction (i.e., in a left and right direction) at full airbag inflation. The width of each of the regulating tethers 40 is greater than the opening width of the corresponding vent hole 25. In the illustrated embodiment, the width of each of the regulating tethers 40 is greater than the length of the corresponding vent hole 25 as well, as shown in FIG. 3, such that each seam 46 (46L and 46R) which sews the outer end 40a of the regulating tether 40 to the left wall region 22/right wall region 23 extends considerably upward and downward at the rear of the vent hole 25, as shown in FIG. 2. That is, since each of the seams 46 of the outer ends 40a of the regulating tethers 40 is disposed in an upwardly and downwardly extensive fashion in a vicinity of and at the rear of the rear edge 25b of the vent hole 25, while the bag body 16 is fully inflated and the tension force T1 is exerted along the length direction of the regulating tethers 40, a major region of the outer circumferential edge of each of the vent holes 25 including the upper edge 25c and lower edge 25d as well as the rear edge 25b is pulled rearward by the regulating tether 40, as shown in FIG. 7. Thus, before the fully inflated bag body 16 cushions the passenger, each of the vent holes 25 is prevented from opening in such a fashion that the upper edge 25c and lower edge 25d are separated, due to the tension force T1, such that each of the vent holes 25 is kept in a elongate shape extending in a front and rear direction (see FIGS. 6 and 10A). The inner ends 40b of the regulating tethers 40 are sewn to the leading end 29a of the recessed region 29 when the leading end 29a of the recessed region 29 is formed by the seam 44 (FIG. 7), as described later.

Figure 8:
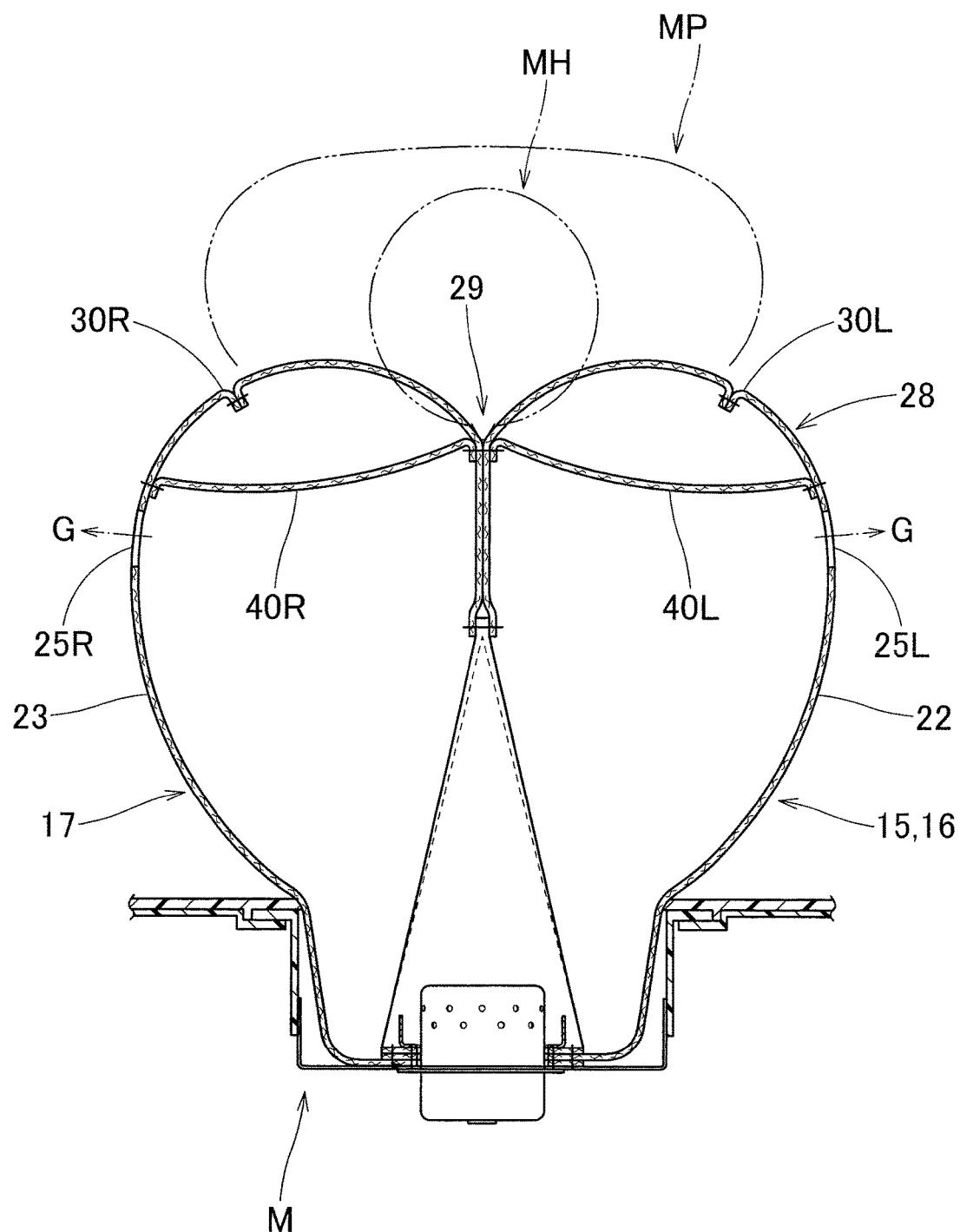
FIG. 8 is a schematic horizontal section of the airbag of the first embodiment as fully deployed and catches a passenger.
Figure 10A:
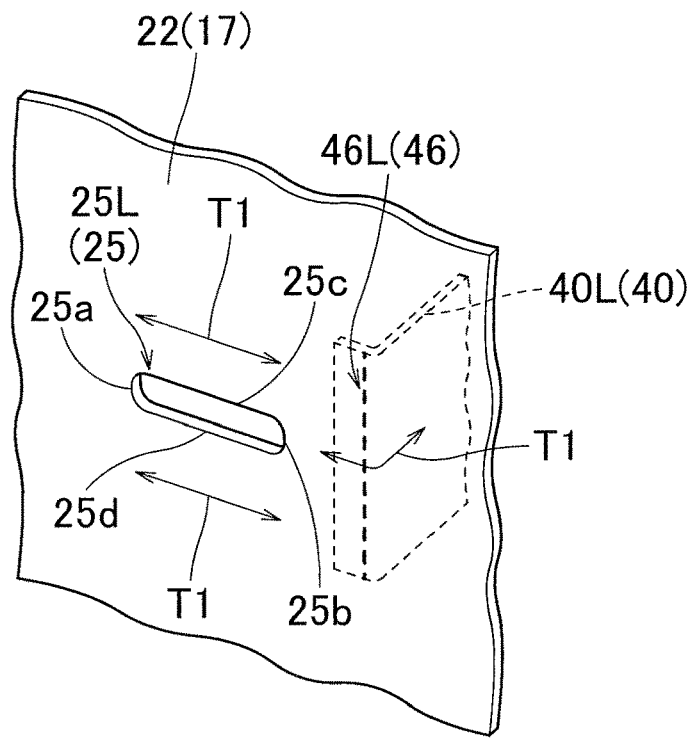
FIG. 10A is a schematic perspective view of a vent hole of the first embodiment before the airbag catches a passenger.
Figure 10B:
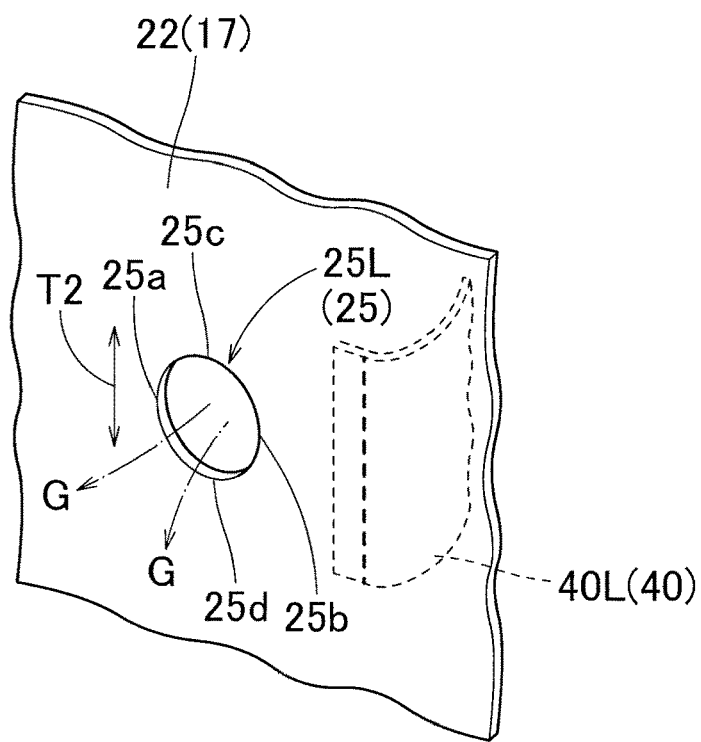
FIG. 10B is a schematic perspective view of the vent hole of the first embodiment after the airbag caught a passenger.
Figure 11:
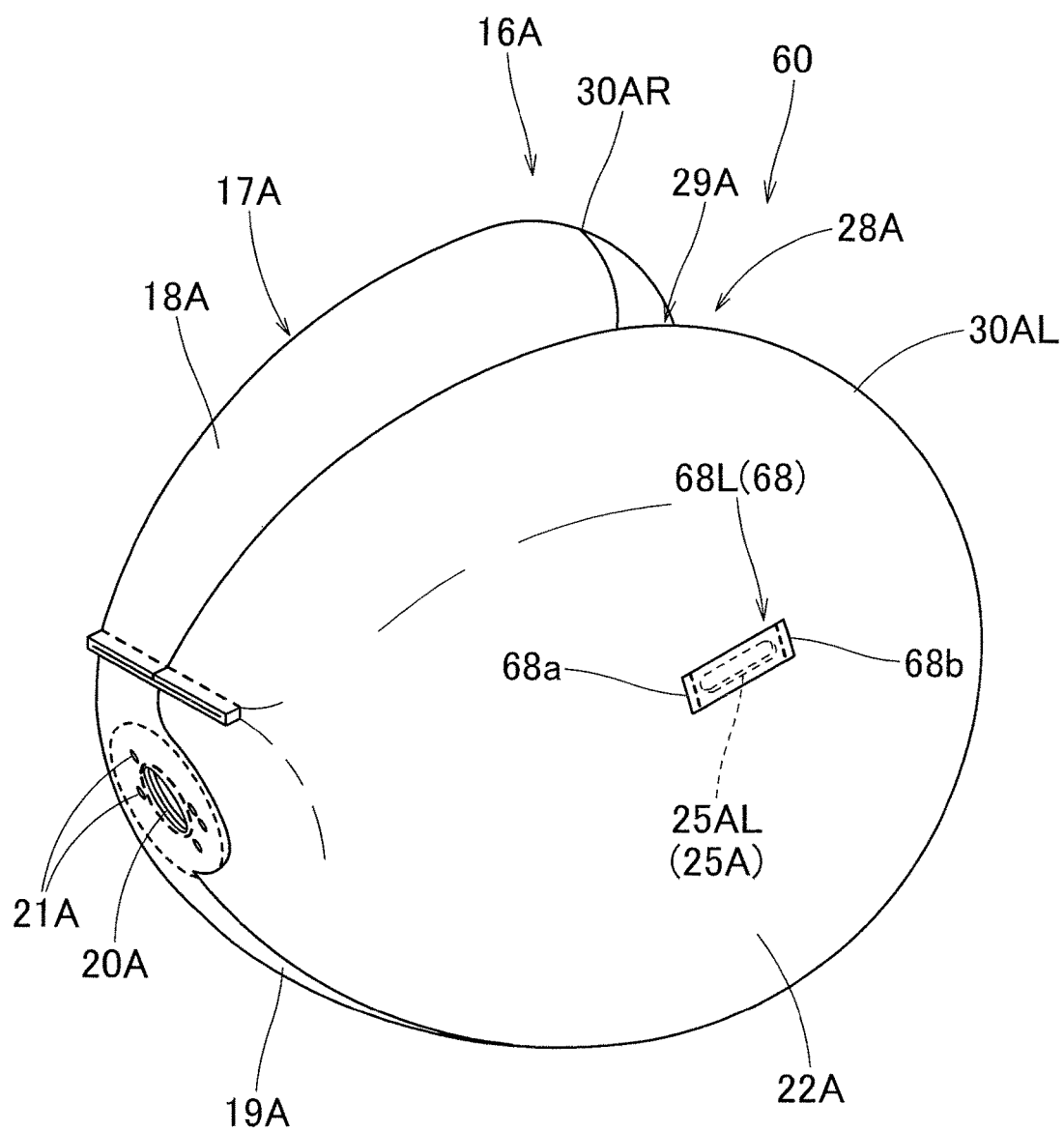
FIG. 11 is a perspective view of an airbag according to the second embodiment of the invention as inflated by itself.

The passenger-side wall 28 of the bag body 16 includes the recessed region 29 and the raised regions 30L and 30R which are protruding on the left and right of the recessed region 29. With this configuration, when the passenger-side wall 28 catches the passenger MP, the raised regions 30L and 30R firstly catch the shoulders MS of the passenger MP since they protrude farther rearward than the recessed region 29. Then the recessed region 29 receives the head MH therein while the raised regions 30L and 30R arrest the shoulders MS, thus the passenger-side wall 28 catches the passenger MP, as shown in FIGS. 7 and 8. Since the inner ends 40b of the regulating tethers 40L and 40R are jointed to the leading end 29a of the recessed region 29, if the passenger-side wall 28 cushions the passenger MP and is pressed forward, the regulating tethers 40 loosen, as shown in FIG. 8. If the regulating tethers 40 loosen, the outer circumferential edges of the vent holes 25 are not pulled rearward any longer. Then, as shown in FIG. 10B, another tension force T2 is exerted in the periphery of each of the vent holes 25 in a direction generally orthogonal to the direction that the passenger MP moves, and each of the vent holes 25 opens considerably in such a fashion that the upper edge 25c and lower edge 25d are separated while the front edge 25a and rear edge 25b come close to each other.

The bag body 16 is formed by sewing together circumferential edges of predetermined shaped base cloths. As shown in FIG. 5, the bag body 16 of the illustrated embodiment is composed of an outer left panel 50 and an outer right panel 51, which mainly constitute the circumferential wall 17, and an inner left panel 53 and an inner right panel 54, which mainly constitute the passenger-side wall 28.

The outer left panel 50 and outer right panel 51 are formed into such a shape that the circumferential wall 17 is split into left and right, and formed into symmetrical, generally sectorial contour, as shown in FIG. 5. The outer left panel 50 and outer right panel 51 are each provided with a protruding region 50a/51a for forming the peripheral region of the gas inlet port 20. The outer left panel 50 constitutes the left wall region 22, a left front half region of the upper wall region 18, a left half region of the lower wall region 19, and a region of the passenger-side wall 28 to the left of the top 30a of the raised region 30L. The outer right panel 51 constitutes the right wall region 23, a right front half region of the upper wall region 18, a right half region of the lower wall region 19, and a region of the passenger-side wall 28 to the right of the top 30a of the raised region 30R. The upper edges 50b and 51b and lower edges 50c and 51c of the outer left panel 50 and outer right panel 51 are sewn together to form the generally tubular circumferential wall 17.

The inner left panel 53 and inner right panel 54 constitute a region of the passenger-side wall 28 between the tops 30a of the raised regions 30L and 30R. More specifically, the panels 53 and 54 form the rear region of the upper wall region 18 of the circumferential wall 17 and a region of the passenger-side wall 28 between the tops 30a of the raised regions 30L and 30R. The inner left panel 53 and inner right panel 54 are configured into a pair of bands each formed into a half-moon shape such that each panel 53/54 forms the left/right half of the above-described region with respect to the leading end 29a of the recessed region 29. That is, the inner left panel 53 constitutes a region from the leading end 29a of the recessed region 29 to the top 30a of the left raised region 30L whereas the inner right panel 54 constitutes a region from the leading end 29a of the recessed region 29 to the top 30a of the right raised region 30R, as shown in FIGS. 4 and 5. In the illustrated embodiment, each of the inner left panel 53 and the inner left panel 54 is provided at the inner circumferential edge 53b/54b with an extended region 53c/54c for forming the rear section 37 of the front-rear tether 35, as shown in FIG. 5. In a flattened state, the outer circumferential edges 53a and 54a of the inner left panel 53 and inner right panel 54 are generally identical in curved shape to the rear edges 50d and 51d of the outer left panel 50 and outer right panel 51.

In the illustrated embodiment, the components of the bag body 16, i.e., the outer left panel 50, outer right panel 51, inner left panel 53, inner right panel 54, the front component 56 of the front-rear tether 35 and regulating tethers 40L and 40R, are formed of a flexible woven fabric of polyester yarn, polyamide yarn or the like.

Manufacturing of the airbag 15 of the first embodiment is now described. Firstly, the inner left panel 53 and inner right panel 54 are overlaid one above the other with the outer circumferential edges mated, and the inner circumferential edges 53b and 54b are sewn together with a sewing thread to form the seam 44. At this time, the inner ends 40b of the regulating tethers 40L and 40R are sewn together with the seam 44. Then the outer left panel 50 and outer right panel 51 are overlaid one above the other with the outer circumferential edges mated, and then the lower edges 50c and 51c are sewn together with a sewing thread. Subsequently, the outer left panel 50 and outer right panel 51 are opened about the seam such that the protruding regions 50a and 51a overlap each other, and the front component 56 of the front-rear tether 35 is placed on the protruding regions 50a and 51a, and sewn thereto with a sewing thread by the region to be the periphery of the gas inlet port 20. Then the gas inlet port 20 and mounting holes 21 are punched out. Subsequently, the outer left panel 50 and outer right panel 51 are mated again such that the outer circumferential edges are mated, and the upper edges 50b and 51b are sewn together with a sewing thread. Thereafter, the outer left panel 50 and outer right panel 51 are so opened that the rear edges 50d and 51d are separated from each other, and the inner left panel 53 and inner right panel 54, which has been so opened as to separate the outer circumferential edges 53a and 54a from each other, are mated thereto. Then the rear edge 50d of the outer left panel 50 and the outer circumferential edge 53a of the inner left panel 53 are sewn together with a sewing thread to form the seam 45L, whereas the rear edge 51d of the outer right panel 51 and the outer circumferential edge 54a of the inner right panel 54 are sewn together with a sewing thread to form the seam 45R. Then the outer ends 40a of the regulating tethers 40L and 40R are sewn to the outer left panel 50 and outer right panel 51 with a sewing thread, at the rear of and proximate to the vent holes 25L and 25R, thus forming the seams 46L and 46R. Thereafter, the main body 36b of the front section 36 of the front-rear tether 35 is double-folded, and the doubled rear end 36c is sewn to the front end 37a of the rear section 37 (i.e., to the front ends of the extended regions 53c and 54c of the inner left panel 53 and inner right panel 54), thus forming the front-rear tether 35. Then the bag body 16 is reversed inside out from an unsewn region at the front edges 50e and 51e of the outer left panel 50 and outer right panel 51 such that seam allowances may not appear outside. Then if each of the front edges 50e and 51e of the outer left panel 50 and outer right panel 51 is doubled and sewn up with a sewing thread, the airbag 15 is completed.

When the airbag 15 is completed, the retainer 9 is housed inside the airbag 15, and then the airbag 15 is folded up so as to fit in the case 12. The folded-up airbag 15 is then wrapped up by a tearable wrapping sheet (not shown) for keeping the folded-up configuration. Then the airbag 15 is placed on the bottom wall 12a of the case 12, and the main body 8a of the inflator 8 is set in the case 12 from the lower side of the bottom wall 12a such that the bolts 9a projecting downwardly from the bottom wall 12a are put through the flange 8c of the inflator 8. If then the bolts 9a projecting out of the flange 8c of the inflator 8 are fastened with nuts 10, the airbag 15 and the inflator 8 are mounted on the case 12.

Thereafter, the circumferential wall 12b of the case 12 is attached to the joint wall 6b of the airbag cover 6 on the dashboard 1, which has been mounted on a vehicle, and unillustrated brackets of the case 12 are secured to a vehicle body structure. Thus the airbag device M is mounted on the vehicle.

After the airbag device M is mounted on the vehicle, in the event of a frontal collision of the vehicle, the inflator 8 discharges an inflation gas G from the gas discharge ports 8b to inflate the airbag 15. Then the airbag 15 pushes and opens the doors 6a of the airbag cover 6. Then the airbag 15 protrudes upward from an opening formed by the opening of the doors 6a, and is deployed rearward as shown in FIGS. 1, 6 and 7.

Figure 9:
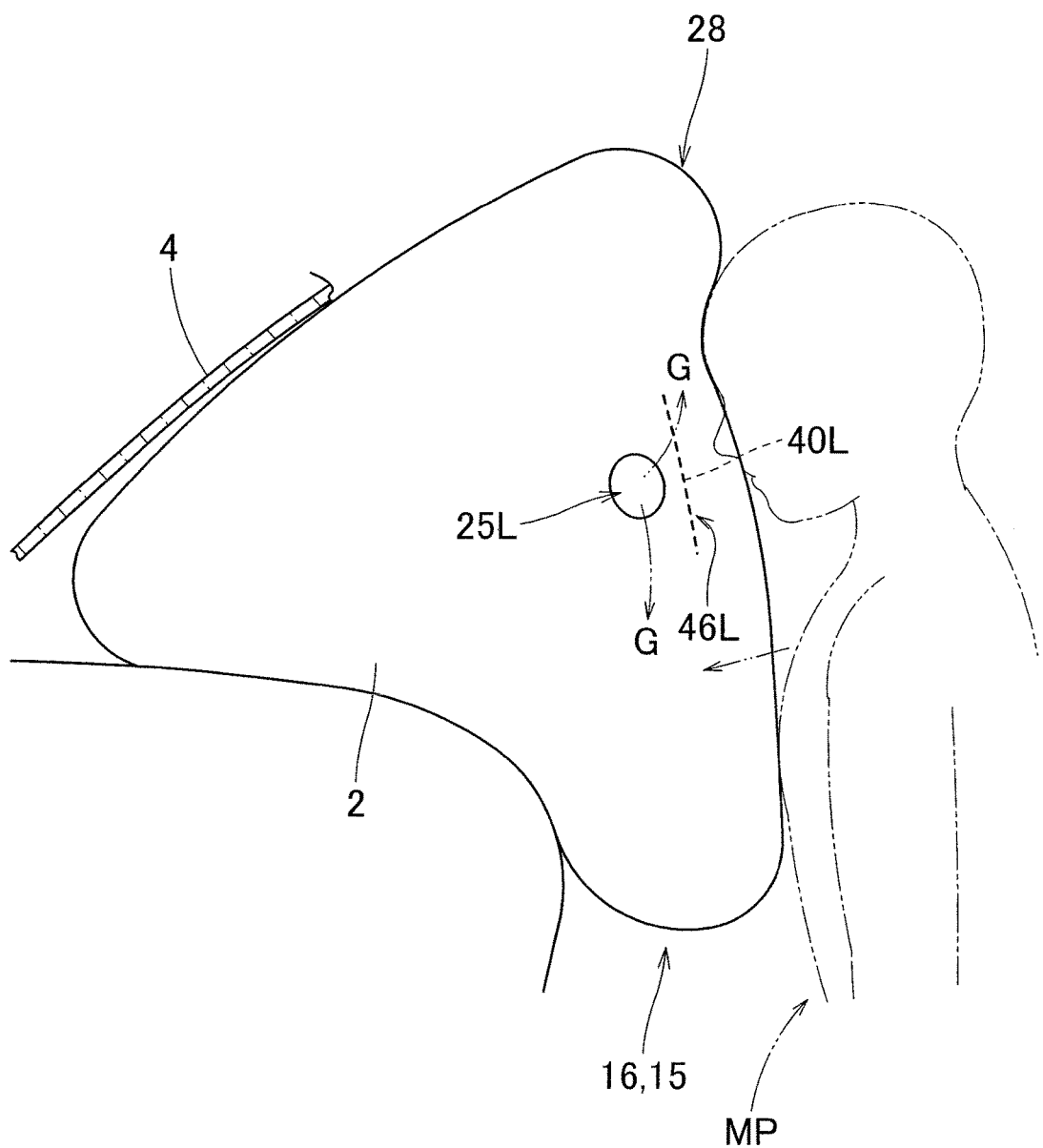
FIG. 9 is a side view of the airbag of the first embodiment as fully deployed and catches a passenger.

In the airbag 15 of the first embodiment, each of the vent holes 25L and 25R is formed into an elongate, slot-like contour whose long axis extends generally along a direction that the front-seat passenger MP advances, as shown in FIG. 6, and is configured deformable due to the tension force T2 which is caused by the regulating tether 40L/40R and acts in the peripheral region of the vent hole in a direction generally orthogonal to the direction that the front-seat passenger MP advances when the passenger-side wall 28 catches the passenger MP. That is, in the airbag 15 of the first embodiment, when the passenger-side wall 28 catches the passenger MP, each of the vent holes 25L and 25R is deformed, along with the forward movement of the passenger MP, in such a manner as to stretch in an up and down direction, i.e., in a direction generally orthogonal to the travel direction of the passenger MP, as shown in FIGS. 9 and 10B. In other words, since the opposite ends in an axial direction (i.e., the front edge 25a and rear edge 25b) of each of the vent holes 25L and 25R come close to each other and each of the vent holes 25L and 25R opens towards the direction generally orthogonal to the travel direction of the passenger MP, each of the vent holes 25L and 25R is deformed into a shape approximate to a true circle. Moreover, each of the regulating tethers 40L and 40R of the first embodiment is disposed at such a position as to exert the tension force T2 in the peripheral region of the vent hole 25L/25R in a direction generally orthogonal to the direction that the passenger MP moves when the passenger-side wall 28 catches the passenger 28. That is, such a tension force T2 is not exerted in the peripheral regions of the vent holes 25L and 25R before the passenger-side wall 28 catches the passenger MP, and the vent holes 25L and 25R are kept in an elongate shape and prevented from opening widely. Accordingly, the airbag 15 of the first embodiment is capable of preventing a great deal of inflation gas from escaping from the vent holes 25L and 25R before catching the passenger, and is capable of releasing a great deal of inflation gas G out of the widely open vent holes 25L and 25R when catching the passenger. That is, the airbag 15 of the first embodiment is capable of cushioning the passenger MP softly and protecting him smoothly since the airbag 15 catches the passenger MP in a fully inflated state and starts releasing a great deal of inflation gas G when bumping the passenger MP.

Therefore, the airbag 15 of the first embodiment is capable of opening the vent holes 25L and 25R widely in a steady fashion when catching the passenger MP, thus is capable of protecting the passenger MP in an adequate fashion with a good exhaust property.

Moreover, in the first embodiment, there are provided two regulating tethers 40L and 40R so as to accommodate or correspond to the two vent holes 25L and 25R, and the outer ends 40a of the regulating tethers 40L and 40R are jointed to vicinities of the rear edges 25b of the vent holes 25L and 25R while the inner ends 40b jointed to the passenger-side wall 28. That is, each of the regulating tethers 40L and 40R connects the vicinity of the rear edge 25b of the vent hole 25L/25R and passenger-side wall 28 straightly at airbag deployment, such that the tension force T1 is exerted between the joint to the vicinity of the rear edge 25b of the vent hole 25L/25R (i.e., the outer end 40a) and the joint to the passenger-side wall 28 (i.e., the inner end 40b), as shown in FIG. 7. Before catching the passenger, the tension force T1 acts in the peripheral regions of the vent holes 25L and 25R in a generally long axis direction of the vent holes 25L and 25R (i.e., in a front and rear direction), as shown in FIG. 10A, and therefore, the vent holes 25L and 25R are kept in the shape of an elongate hole. Then when the passenger MP is thrown against the passenger-side wall 28 and presses the wall 28 forward, the regulating tethers 40L and 40R loosen as shown in FIG. 8, then the tension force T2 is exerted in the peripheral regions of the vent holes 25L and 25R in the direction generally orthogonal to the moving direction of the passenger MP, and the tension force T2 gradually overpowers the tension force T1, such that the vent holes 25L and 25R are deformed in such a fashion that the front edge 25a and rear edge 25b come close to each other and the upper edge 25c and lower edge 25d are separated from each other, i.e., open widely as shown in FIGS. 9 and 10B. Therefore, the airbag 15 of the first embodiment is capable of keeping the vent holes 25L and 25R in the shape of an elongate hole and preventing an inadvertent escape of inflation gas before catching the passenger MP in a further adequate fashion.

The second embodiment of the invention is now described. An airbag 60 according to the second embodiment is used for a top-mount airbag device for a front passenger seat, in a similar fashion to the airbag 15 of the first embodiment. As shown in FIGS. 11 to 14, the airbag 60 includes a bag body 16A which is inflatable with an inflation gas, a front-rear tether 35A and two left-right tethers 62 and 64 which are disposed inside the bag body 16A for regulating the contour of the bag body 16A as fully inflated, and patches 68 (68L and 68R) which cover vent holes 25A (25AL and 25AR). In the airbag 60 of the second embodiment, the bag body 16A and the front-rear tether 35A have the same configurations as the bag body 16 and front-rear tether 35 of the first embodiment, and therefore, they share the same reference numerals as those of the first embodiment with "A" at the tail ends, and the detailed descriptions will be omitted.

Figure 12:
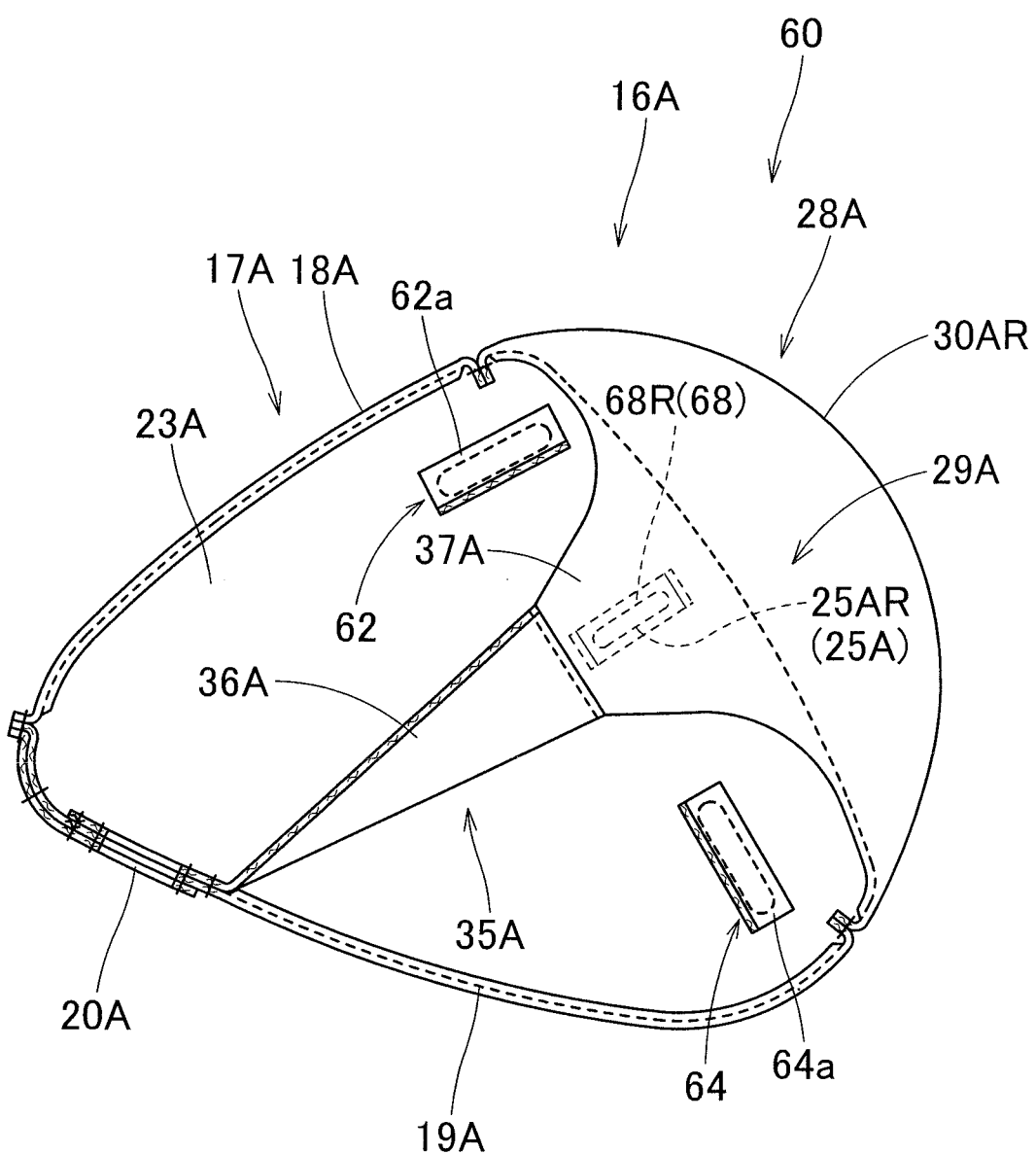
FIG. 12 is a schematic vertical section of the airbag of FIG. 11 taken along a front and rear direction.
Figure 14:
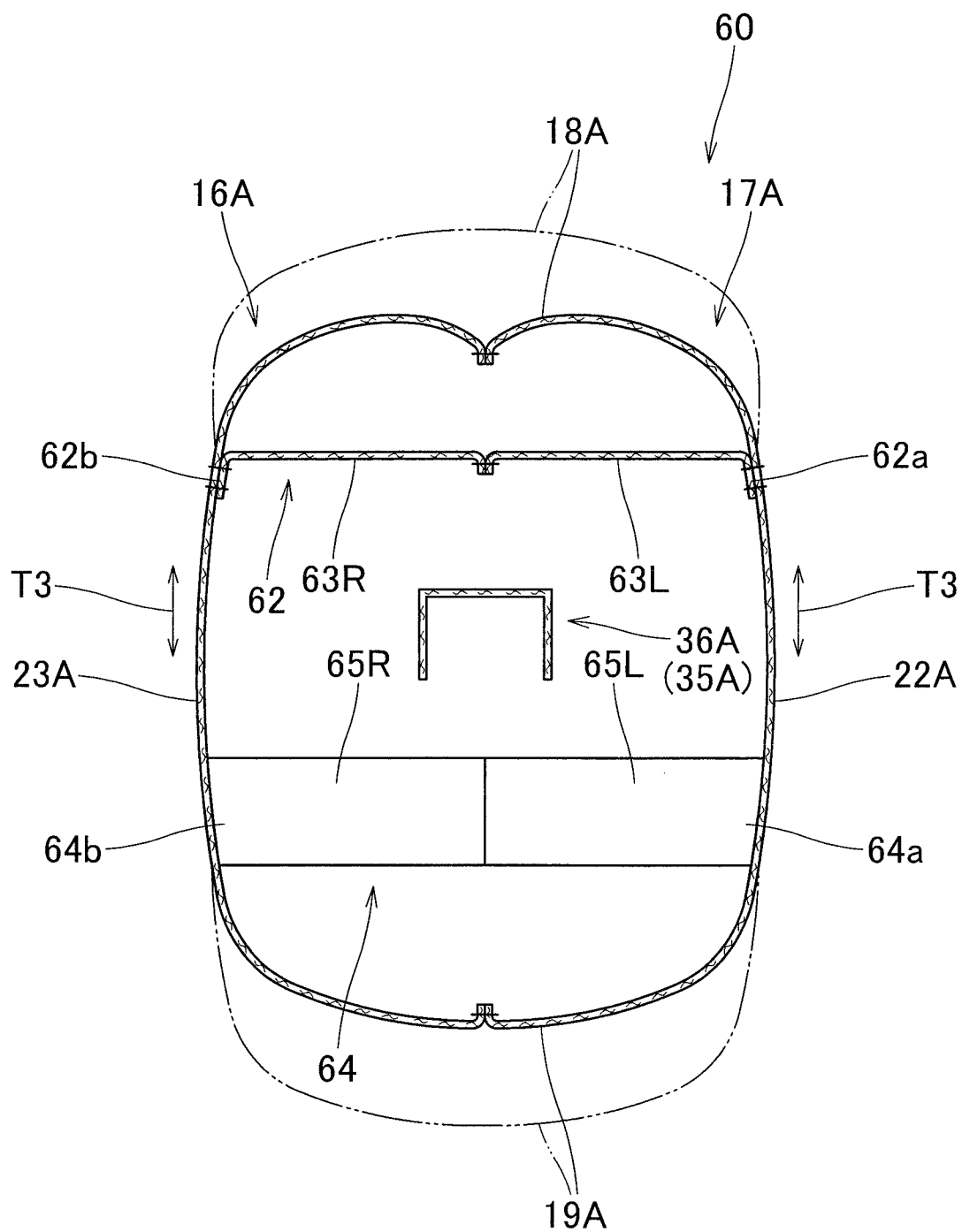
FIG. 14 is a schematic vertical section of the airbag of FIG. 11 taken along a left and right direction.

The left-right tethers 62 and 64 are disposed inside the bag body 16A for regulating the contour of the bag body 16A as fully inflated. Specifically, as shown in FIGS. 12 and 14, the left-right tethers 62 and 64 are disposed at two positions, above and below the front-rear tether 35A. Each of the left-right tethers 62 and 64 connects the left wall region 22A and right wall region 23A and are disposed generally along a left and right direction of the bag body 16A as fully inflated. In the illustrated embodiment, the left-right tethers 62 and 64 are disposed above and below the vent holes 25AL and 25AR in such a manner as to sandwich the vent holes 25AL and 25AR. The left-right tether 62, which is located above the vent holes 25AL and 25AR and front-rear tether 35A, is formed into a band, and is deployable in such a manner that the width direction extends generally along a front and rear direction and the length direction extends generally along a horizontal direction. More specifically, at airbag deployment, the left-right tether 62 is slanted off a front and rear direction such that the rear edge is located above the front edge. The left-right tether 64, which is located below the vent holes 25AL and 25AR and front-rear tether 35A, is formed into a band, and is deployable in such a manner that the width direction extends generally along an up and down direction and the length direction extends generally along a horizontal direction. As shown in FIG. 12, at airbag deployment, the left-right tether 64 is slanted off an up and down direction such that the lower end is located farther rearward than the upper end and thus the left-right tether 64 is generally orthogonal to the left-right tether 62 as viewed from a side. In the illustrated embodiment, each of the left-right tethers 62 and 64 is formed by jointing a pair of base cloths 63L and 63R/65L and 65R in a serial fashion in a left and right direction, as shown in FIG. 14.

Each of the left-right tethers 62 and 64 is jointed to the left wall region 22A by the left end 62a/64a and jointed to the right wall region 23A by the right end 62b/64b, thus the left-right tethers 62 and 64 regulate a clearance between the left wall region 22A and right wall region 23A at airbag deployment. The left-right tethers 62 and 64 also help prevent the left wall region 22A and right wall region 23A from being deformed in such a manner as to draw away from each other when the passenger-side wall 28 catches the passenger and is deformed in such a manner as to be pressed forward. At this time, the upper wall region 18A and lower wall region 19A will bulge in such a manner as to draw away from each other as indicated with double-dotted lines in FIG. 14, and pull and stretch the left wall region 22A and right wall region 23A in an up and down direction. That is, the left-right tethers 62 and 64 help exert a tension force T3 in the peripheries of the vent holes 25A in a direction generally orthogonal to the moving direction of the passenger MP (i.e., in an up and down direction) when the passenger-side wall 28 catches the passenger MP, as shown in FIG. 17B.

Figure 13:
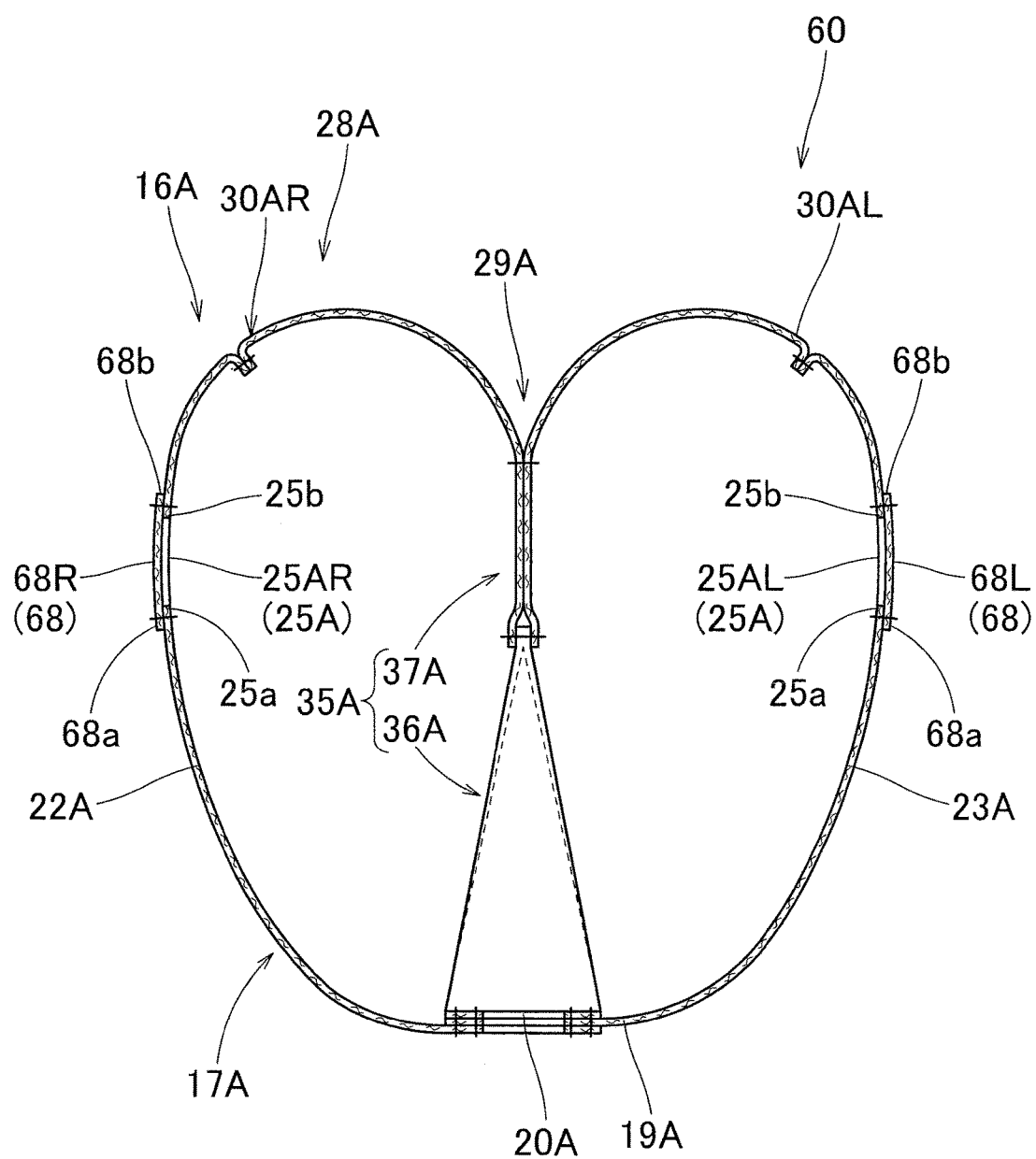
FIG. 13 is a schematic horizontal section of the airbag of FIG. 11 taken along a front and rear direction.
Figure 17A:
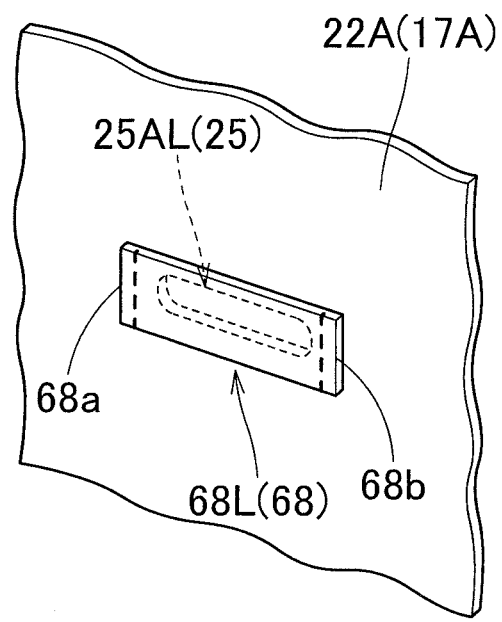
FIG. 17A is a schematic perspective view of a vent hole of the second embodiment before the airbag catches a passenger.

The patches 68 (68L and 68R) that cover the vent holes 25A (25AL and 25AR) are each composed of a flexible sheet-shaped member. Each of the patches 68 of the illustrated embodiment is formed of a flexible woven fabric of polyester yarns, polyamide yarns or the like, in a similar fashion to the bag body 16A. In the illustrated embodiment, each of the patches 68 is formed into a generally rectangle which is large enough to cover the vent hole 25A entirely. More specifically, each of the patches 68 is formed into a generally rectangle which extends generally along a long axis direction of the vent hole 25A (i.e., along a front and rear direction), and the widths in the length direction and width direction of each of the patches 68 are both greater than those of the vent hole 25A so as to cover the vent hole 25A entirely (FIG. 17A). The patches 68 of the illustrated embodiment cover the vent holes 25A on an outer surface of the bag body 16A, and are each sewn (jointed) to the left wall region 22A/right wall region 23A by the opposite edges in a long axis direction of the vent hole 25A, i.e., by the front edge 68a and rear edge 68b, at vicinities of the front edge 25a and rear edge 25b of the vent hole 25A, as shown in FIGS. 13 and 15.

The airbag 60 of the second embodiment is produced and mounted on a vehicle in a similar fashion to the airbag 15 of the first embodiment.

Figure 15:
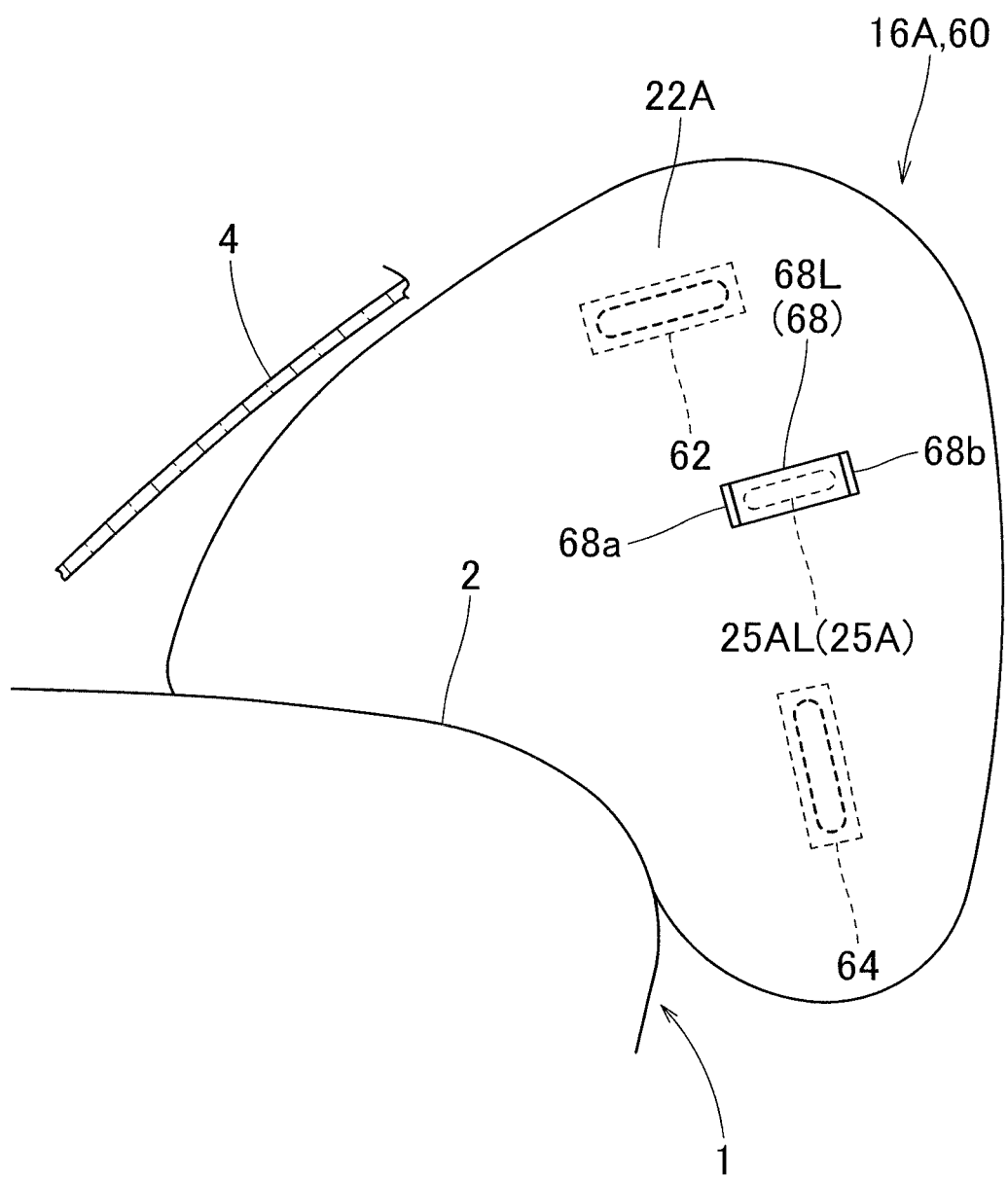
FIG. 15 is a side view of an airbag device provided with the airbag of FIG. 11 as the airbag is fully deployed.
Figure 17B:
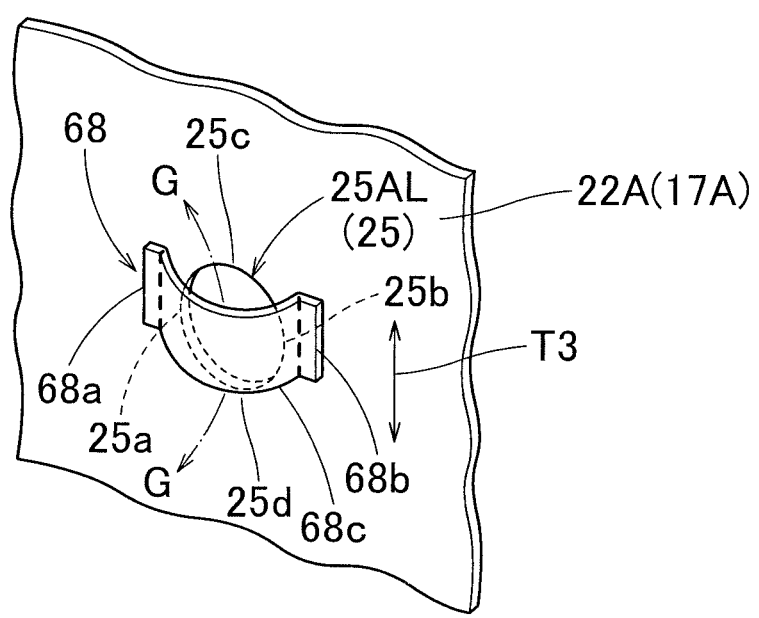
FIG. 17B is a schematic perspective view of the vent hole of the second embodiment after the airbag caught a passenger.

In the airbag 60 of the second embodiment, the vent holes 25A disposed on the left wall region 22A and right wall region 23A are each formed into an elongate hole whose long axis extends generally along a direction that the passenger MP moves, as shown in FIGS. 15 and 17, and each of the vent holes 25A is configured deformable due to the tension force T3 which is caused by the left-right tethers 62 and 64 and acts in the peripheral region of the vent hole in a direction generally orthogonal to the direction that the passenger MP moves when the passenger-side wall 28A catches the passenger MP, as shown in FIG. 17B. That is, in the airbag 60 of the second embodiment, when the passenger-side wall 28A catches the passenger MP, each of the vent holes 25A is deformed, along with the forward movement of the passenger MP, in such a manner as to stretch and open in an up and down direction, i.e., in a direction generally orthogonal to the travel direction of the passenger MP. Thus each of the vent holes 25A is deformed into a shape approximate to a true circle. Moreover, each of the left-right tethers 62 and 64 of the second embodiment is disposed at such a position as to exert the tension force T3 in the peripheral region of the vent hole 25A in a direction generally orthogonal to the direction that the passenger MP moves when the passenger-side wall 28A catches the passenger MP. That is, such a tension force T3 is not exerted in the peripheral regions of the vent holes 25A before the passenger-side wall 28A catches the passenger MP, and the vent holes 25A are kept in an elongate shape and prevented from opening. Accordingly, the airbag 60 of the second embodiment is capable of preventing a great deal of inflation gas from escaping out of the vent holes 25A before catching the passenger, and is capable of releasing a great deal of inflation gas G out of the widely open vent holes 25A when catching the passenger, as shown in FIG. 17B. That is, the airbag 60 of the second embodiment is capable of cushioning the passenger MP softly and protecting him smoothly since the airbag 60 catches the passenger MP in a fully inflated state and starts releasing a great deal of inflation gas G when bumping the passenger MP.

Therefore, the airbag 60 of the second embodiment is capable of opening the vent holes 25A widely in a steady fashion when catching the passenger MP, thus is capable of protecting the passenger MP in an adequate fashion with a good exhaust property.

In the airbag 60 of the second embodiment, the left-right tethers 62 and 64 connect the left wall region 22A and right wall region 23A for regulating the clearance between the left wall region 22A and right wall region 23A at airbag deployment. This configuration will help prevent the left wall region 22A and right wall region 23A from being deformed in such a manner as to draw away from each other when the passenger-side wall 28A catches the passenger and is deformed in such a manner as to be pressed forward. At this time, the upper wall region 18A and lower wall region 19A will bulge in such a manner as to draw away from each other as indicated with double-dotted lines in FIG. 14, and pull and stretch the left wall region 22A and right wall region 23A in an up and down direction. That is, the tension force T3 caused by the deformation of the left wall region 22A and right wall region 23A acts in the peripheries of the vent holes 25A such that the vent holes 25A are deformed smoothly in such a manner that the front edge 25a and rear edge 25b come close to each other while the upper edge 25c and lower edge 25d are separated from each other, such that a great deal of inflation gas G may be released out of the deformed vent holes 25A when the airbag 60 catches the passenger. Especially, the two left-right tethers 62 and 64 of the second embodiment are located above and below the vent holes 25A in such a manner as to sandwich the vent holes 25A. This configuration will securely prevent the regions of the left wall region 22A and right wall region 23A in the peripheries of the vent holes 25A from being deformed in such a manner as to draw away from each other when the airbag 60 catches the passenger. Such a left-right tether does not necessarily have to be provided in two places like the illustrated embodiment, but may be provided in only one place. If the left-right tether is provided in only one place, it will be preferably located proximate to the vent holes.

Figure 16:
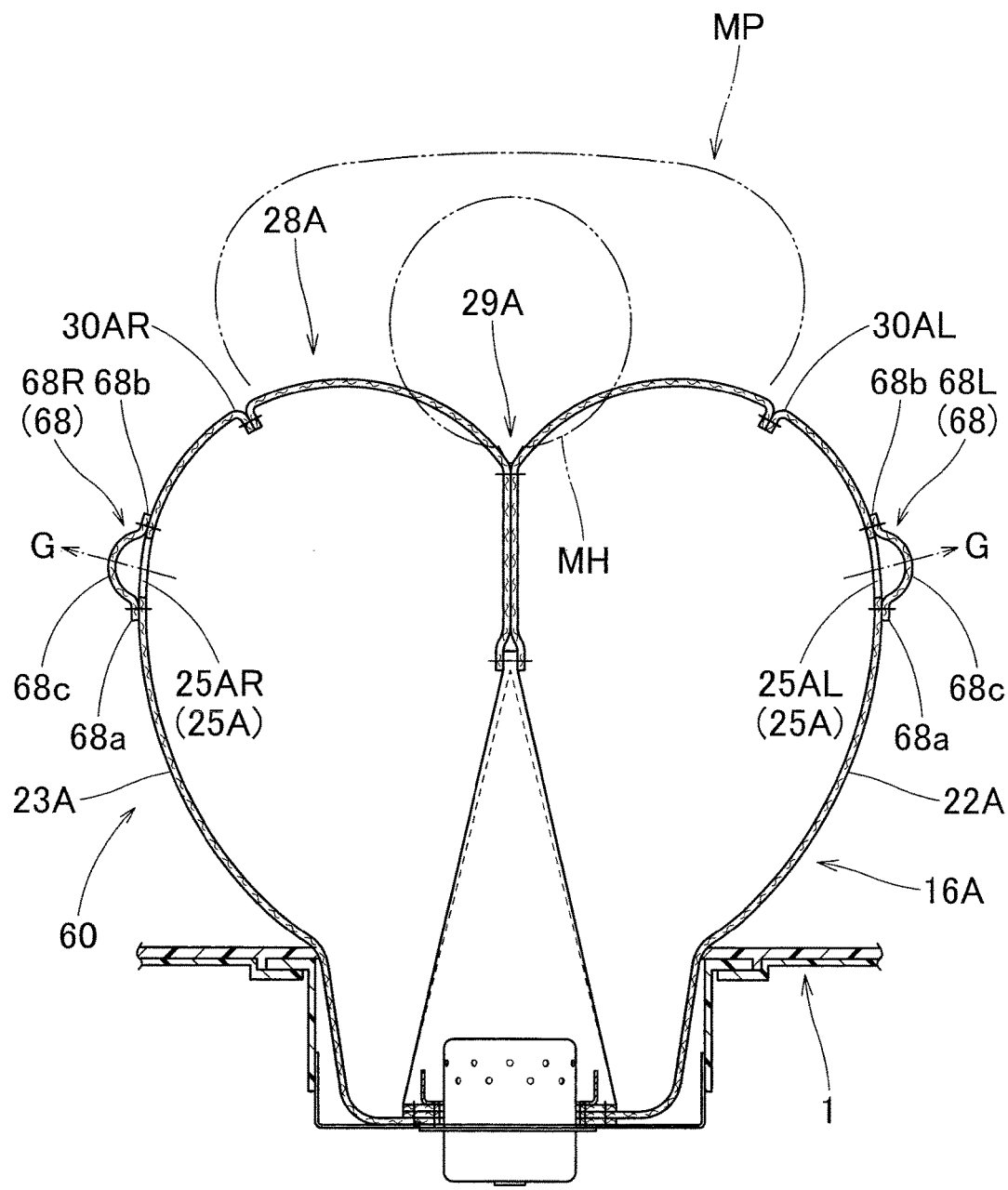
FIG. 16 is a schematic horizontal section of the airbag of the second embodiment as fully deployed and catches a passenger.
Figure 18:
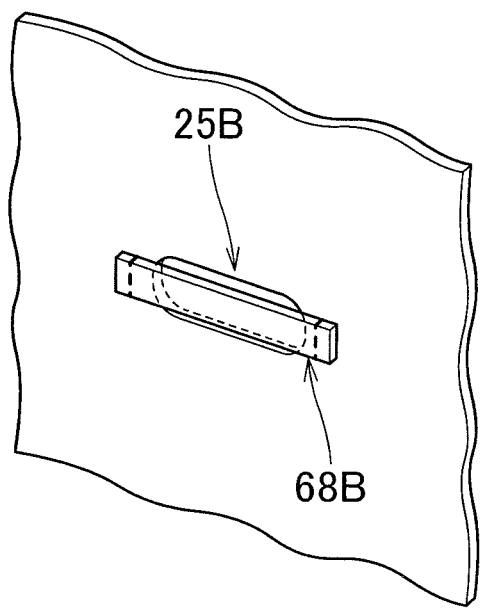
FIG. 18 depicts a modification of a patch of the second embodiment by perspective views.
Figure 18:
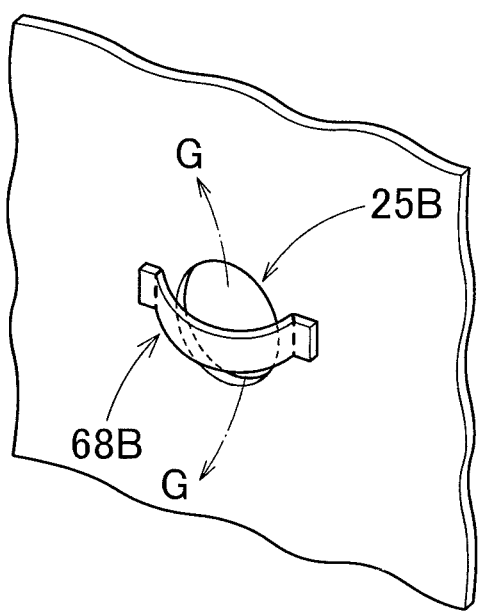

The airbag 60 of the second embodiment is provided with the patches 68 that cover the vent holes 25A and are jointed to the circumferential wall 17A (i.e., to the left wall region 22A and right wall region 23A) only by the opposite edges of each of the patches in a long axis direction of the vent hole 25A. Each of the patches 68 prevents the escape of an inflation gas before the airbag 60 catches the passenger, and since each of the patches 68 is jointed to the left wall region 22N right wall region 23A only by the opposite edges in a long axis direction of the vent hole 25A (i.e., by the front edge 68a and rear edge 68b), the patch 68 will not hinder the vent hole 25A from being deformed in such a manner that the front edge 25a and rear edge 25b come close to each other and the upper edge 25c and lower edge 25d are separated from each other when the airbag 60 or bag body 16A catches the passenger. Then if the vent hole 25A is deformed in such a manner that the front edge 25a and rear edge 25b come close to each other, an intermediate region 68c of the patch 68 will loosen as shown in FIGS. 16 and 17B, and the patch 68 will allow the vent hole 25A to release a great deal of inflation gas G. Especially, since each of the patches 68 of the second embodiment is configured to cover an entire opening area of the vent hole 25A, the escape of the inflation gas will be prevented in a secure fashion before the airbag 60 catches the passenger. Although the patch 68 of the second embodiment is configured to cover the entire opening area of the vent hole 25A, the patch may also be so configured to cover only a part of the vent hole like a patch 68B shown in FIG. 18. The patch 68B is formed into a band with a width narrower than an opening width of the vent hole 25B. Furthermore, if such an advantageous effect as described above does not have to be considered, the airbag of the invention may be configured without a patch for covering a vent hole. Although the airbag 15 of the first embodiment is not provided with a patch on the vent hole 25, the airbag 15 may be provided with a patch on the outside of the vent hole 25. Further, although the patches 68 and 68B of the foregoing embodiments are located on the outer surfaces of the bag bodies 16A and 16B, the patch may be disposed on an inner surface of the bag body. However, if the patch is disposed on the inner surface of the bag body, when the airbag catches a passenger such that the vent hole is deformed, the patch will loosen outwardly and protrude out of the vent hole. Therefore, in order to open the vent hole widely and smoothly, the patch is preferably disposed on the outer surface of the bag body.

In the airbags 15 and 60 of the foregoing embodiments, the vent holes 25 and 25A are both formed into an elongate, slot-like contour which has a generally uniform opening width over an entire region in a front and rear direction.

However, the outer contour of the vent hole should not be limited thereby. The vent hole may be oval, or may be composed of a slit formed on the circumferential wall. Further, although the passenger-side walls 28 and 28A of the foregoing embodiments are each provided with the recessed region 29/29A and raised regions 30L and 30R/30AL and 30AR which are raised on the left and right of the recessed region 29/29A, the present invention may be applied to an airbag with a planar passenger-side wall.

What is claimed is:

1. An airbag for a front passenger seat adapted to be stored in a storage which is disposed on an instrument panel of a vehicle in front of the front passenger seat, the airbag being inflatable and deployable rearward when fed with an inflation gas, the airbag comprising:
    a passenger-side wall that is deployable generally along an up and down direction at a rear end of the airbag for catching a front-seat passenger;
    a circumferential wall that is deployable in such a manner as to extend forward from the passenger-side wall in a narrowing fashion, the circumferential wall is adapted to be mounted on the storage by a front end region thereof and includes a left wall region and a right wall region which are opposed in a left and right direction at airbag deployment;
    a vent hole that is formed on the left wall region and the right wall region for releasing an extra inflation gas, each of the vent holes is formed into an elongate hole whose long axis extends generally along a direction that the front-seat passenger advances; and
    a tether that is disposed inside the airbag so as to be deployable generally along a left and right direction, the tether is disposed at such a position as to exert a tension force in a peripheral region of each of the vent holes in a direction generally orthogonal to the direction that the passenger advances when the passenger-side wall catches the passenger,
    wherein:
    there is provided a plurality of the tethers so as to correspond to each of the vent holes; and
    a first end of each of the tethers is jointed to a vicinity of a rear edge of the vent hole and a second end of each of the tethers is jointed to the passenger-side wall.

2. The airbag for a front passenger seat of claim 1, further comprising a patch that is composed of a flexible sheet-shaped member and covers at least a part of an opening area of the vent hole at airbag deployment, the patch being jointed to the circumferential wall only by opposite edges of the patch in a long axis direction of the vent hole.

3. The airbag for a front passenger seat of claim 2, wherein the patch is disposed on an outer surface of the airbag.

4. The airbag for a front passenger seat of claim 1, wherein the passenger-side wall comprises:
    a recessed region that is disposed at a generally center in a left and right direction of the passenger-side wall at airbag deployment and extends over a generally entire area in an up and down direction of the passenger-side wall; and
    a pair of raised regions that are disposed on the left and right of the recessed region and protrude rearward relative to the recessed region at airbag deployment, the raised regions extend over a generally entire area in an up and down direction of the passenger-side wall.

5. The airbag for a front passenger seat of claim 1, wherein
    a width of each of the tethers is greater than an opening width of the corresponding vent hole.

6. An airbag for a front passenger seat adapted to be stored in a storage which is disposed on an instrument panel of a vehicle in front of the front passenger seat, the airbag being inflatable and deployable rearward when fed with an inflation gas, the airbag comprising:
    a passenger-side wall that is deployable generally along an up and down direction at a rear end of the airbag for catching a front-seat passenger;
    a circumferential wall that is deployable in such a manner as to extend forward from the passenger-side wall in a narrowing fashion, the circumferential wall is adapted to be mounted on the storage by a front end region thereof and includes a left wall region and a right wall region which are opposed in a left and right direction at airbag deployment;
    a vent hole that is formed on the left wall region and the right wall region for releasing an extra inflation gas, each of the vent holes is formed into an elongate hole whose long axis extends generally along a direction that the front-seat passenger advances; and
    a tether that is disposed inside the airbag so as to be deployable generally along a left and right direction, the tether is disposed at such a position as to exert a tension force in a peripheral region of each of the vent holes in a direction generally orthogonal to the direction that the passenger advances when the passenger-side wall catches the passenger,
    wherein
    the tether connects the left wall region and right wall region of the circumferential wall for regulating a clearance between the left wall region and right wall region at airbag deployment, and
    there is provided a plurality of the tethers that are respectively disposed above and below the vent holes.

7. The airbag for a front passenger seat of claim 6, further comprising a patch that is composed of a flexible sheet-shaped member and covers at least a part of an opening area of the vent hole at airbag deployment, the patch being jointed to the circumferential wall only by opposite edges of the patch in a long axis direction of the vent hole.

8. The airbag for a front passenger seat of claim 7, wherein the patch is disposed on an outer surface of the airbag.

* * * * *